United States Patent
Lin

(10) Patent No.: US 10,659,608 B2
(45) Date of Patent: May 19, 2020

(54) METHOD, DEVICE AND SYSTEM FOR COMMUNICATING WITH CALL CENTER

(71) Applicant: Tencent Technology (Shenzhen) Company Limited, Shenzhen (CN)

(72) Inventor: Yuzhang Lin, Shenzhen (CN)

(73) Assignee: Tencent Technology (Shenzhen) Company Limited, Shenzhen, Guangdong Province (CN)

(*) Notice: Subject to any disclaimer, the term of this patent is extended or adjusted under 35 U.S.C. 154(b) by 0 days.

(21) Appl. No.: 16/102,465

(22) Filed: Aug. 13, 2018

(65) Prior Publication Data

US 2018/0352083 A1 Dec. 6, 2018

Related U.S. Application Data

(63) Continuation-in-part of application No. PCT/CN2017/087954, filed on Jun. 12, 2017.

(30) Foreign Application Priority Data

Jun. 12, 2016 (CN) .......................... 2016 1 0409850

(51) Int. Cl.
*H04M 11/00* (2006.01)
*H04M 3/493* (2006.01)
(Continued)

(52) U.S. Cl.
CPC .... *H04M 3/4938* (2013.01); *H04L 29/06496* (2013.01); *H04L 65/1083* (2013.01);
(Continued)

(58) Field of Classification Search
CPC .. H04M 3/4938; H04M 3/493; H04M 3/5166; H04L 29/06496; H04L 65/1083; H04L 65/4007; H04L 65/4015
(Continued)

(56) References Cited

U.S. PATENT DOCUMENTS 6,091,805 A * 7/2000 Watson .................. G07F 7/00
379/93.17
2006/0285662 A1* 12/2006 Yin .................. H04M 3/42382
379/88.16
(Continued)

FOREIGN PATENT DOCUMENTS

CN 103002166 A 3/2013
CN 103118206 A 5/2013
(Continued)

OTHER PUBLICATIONS

Tencent Technology, ISRWO, PCT/CN2017/087954, Jul. 28, 2017, 8 pgs.
(Continued)

*Primary Examiner* — Md S Elahee
(74) *Attorney, Agent, or Firm* — Morgan, Lewis & Bockius LLP

(57) ABSTRACT

A method for communicating with a call center, is performed at a device having one or more processors and memory. The device establishes, by an audio and video client, a network session connection to the call center by using an audio and video server. The device receives, through the network session connection, a first-level voice menu sent by the call center. The device obtains a correspondence between visualized menus and voice menus of the call center. The device searches for a first visualized menu corresponding to the first-level voice menu according to the correspondence. The device presents the first visualized menu in a user interface of the audio and video client.

20 Claims, 25 Drawing Sheets

(51) Int. Cl.
*H04L 29/06* (2006.01)
*H04M 3/51* (2006.01)

(52) U.S. Cl.
CPC ...... *H04L 65/4007* (2013.01); *H04L 65/4015* (2013.01); *H04M 3/493* (2013.01); *H04M 3/5166* (2013.01); *H04M 2203/254* (2013.01)

(58) Field of Classification Search
USPC ....... 379/88.13, 93.17, 265.01–266.1, 88.16; 455/419, 415
See application file for complete search history.

(56) References Cited

U.S. PATENT DOCUMENTS

| | | | | |
|---|---|---|---|---|
| 2013/0150017 A1* | 6/2013 | Gold | .................... | H04W 88/02 455/419 |
| 2013/0244632 A1* | 9/2013 | Spence | .................. | H04M 3/51 455/415 |
| 2015/0010136 A1 | 1/2015 | Lavian et al. | | |
| 2018/0198915 A1* | 7/2018 | Dong | .................. | H04M 3/5191 |

FOREIGN PATENT DOCUMENTS

| | | |
|---|---|---|
| CN | 103250402 A | 8/2013 |
| CN | 103428377 A | 12/2013 |
| CN | 104202342 A | 12/2014 |
| CN | 105933555 A | 9/2016 |
| JP | 2013251699 A | 12/2013 |
| JP | 2014123845 A | 7/2014 |
| KR | 20120018877 A | 3/2012 |
| KR | 20140017847 A | 2/2014 |
| KR | 20150032205 A | 3/2015 |

OTHER PUBLICATIONS

Tencent Technology, IORO, PCT/CN2017/087954, Dec. 18, 2018, 7 pgs.

* cited by examiner

METHOD, DEVICE AND SYSTEM FOR COMMUNICATING WITH CALL CENTER

PRIORITY CLAIMS AND RELATED APPLICATIONS

This application is a continuation-in-part application of PCT application number PCT/CN2017/087954, entitled "METHOD, DEVICE AND SYSTEM FOR COMMUNICATING WITH CALL CENTER", filed with the Chinese Patent Office on Jun. 12, 2017, which claims priority to Chinese Patent Application No. 201610409850.6, entitled "METHOD, DEVICE AND SYSTEM FOR COMMUNICATING WITH CALL CENTER" filed with the Patent Office of China on Jun. 12, 2016, all of which are incorporated by reference in their entirety.

FIELD OF THE TECHNOLOGY

This application relates to the field of communications technologies, and specifically to a method, device and system for communicating with a call center.

BACKGROUND OF THE DISCLOSURE

Currently, many enterprises have deployed a call center. The call center is a platform connected to a media gateway (MGW) and a media gateway control function (MGCF) gateway in a Public Switched Telephone Network (PSTN) network and responsible for processing related Session Initiation Protocol (SIP) signaling and voice rich media streams. Users can conveniently perform operations such as service consulting and service handling by means of the call center.

In the existing technology, a user may call a call center of an enterprise by using a phone terminal, and the call center sends a service menu of a corresponding service to the phone terminal in a voice manner. In this way, the user can receive the service menu by using the phone terminal and interact with the call center to implement various service operations. However, an existing method for interacting with a call center in a voice manner requires a user to listen to and memorize a voice menu first and then perform a corresponding operation according to a voice prompt, leading to inconvenient user operation.

Conventional call centers use voice menus that are complicated and difficult for a user to follow and select the correct options. Without the ability to visualize the call center option menus, the user frequently makes the wrong selection and goes down a menu path that is not what he/she needs, or the user may miss the correct option and have to listen to the entire menu and then replay the menu to select the correct option. The call experience with conventional call centers with automated voice-over menus is also time-consuming and frustrating to the user. In addition, due to the excessive amount of time that each user may spend on the call with the call center during the menu navigation stage, the call center server may be overloaded and reject new incoming calls or drop on-going calls, making the user's experience even worse.

With the conventional call centers' voice menu navigation, the requirement on the call center's data processing capabilities is high, making the cost of operating a call center prohibitive for many enterprises. As such, there is a need for an improved way to operate call centers. Currently, some large enterprises provide visual menu call centers. However, the call center server is designed specially to include visual and audio menu capabilities at the coding level for the call center server's operation. Such implementation is not feasible for smaller enterprises that do not have resources to operate its own call centers or specifically program the call center server for its own customized visual and audio menu capabilities. Thus, there is also a need for a generalized solution to adapt to existing call center structures and operations, and provide customized visual menu capabilities on top of existing audio menu capabilities of the existing call center structures and operations.

SUMMARY

Embodiments of the present disclosure provide a method, device and system for communicating with a call center, to present a visualized menu corresponding to a voice menu for a user, thus facilitating the operation of the user. The method, device and system of the present disclosure enable existing call centers to continue to operate and at the same time allowing the users to see and interact with visualized menus and submit input in various formats to the call center. The adaptation is performed on a third party server and/or third-party application (e.g., a VOIP app, or instant messaging app with VOIP function) that interface with the call center server, and does not require the call center server to perform operations other than the existing call center functions. The additional adaptation functionality (e.g., through the use of IVR (Interactive Voice Response) templates) can be utilized by many different enterprises and on different customized menu configurations and interaction needs, which is extensible and versatile for different enterprise needs and expansion of the services.

In one aspect, a method is performed at a computing device (e.g., a client device or a server device that provides VOIP (voice over IP) function, such as through a standalone VOIP app or an instant messaging application) having one or more processors and memory. The device establishes, by an audio and video client, a network session connection to the call center by using an audio and video server. The device receives, through the network session connection, a first-level voice menu sent by the call center. The device obtains a correspondence between visualized menus and voice menus of the call center. The device searches for a first visualized menu corresponding to the first-level voice menu according to the correspondence. The device presents the first visualized menu in a user interface of the audio and video client.

According to a second aspect of the present disclosure, a computing device includes one or more processors, memory, a display, a touch-sensitive surface, and a plurality of instructions stored in the memory that, when executed by the one or more processors, cause the computing device to perform the aforementioned method.

According to a third aspect of the present disclosure, a non-transitory computer readable storage medium storing a plurality of instructions configured for execution by a computing device having one or more processors, the plurality of instructions causing the computing device to perform the aforementioned method.

Details of one or more embodiments of the present disclosure are provided in the following accompanying drawings and descriptions. Other features, objectives, and advantages of the present disclosure become clear in the specification, the accompanying drawings, and the claims.

Based on the above, in the method of this embodiment, an audio and video client receives, through a network session connection, a first-level voice menu sent by a call center, finds a first visualized menu corresponding to the first-level voice menu according to a correspondence between visualized menus and voice menus of the call center, and presents the first visualized menu. Hence, a user can communicate with the call center by directly operating the first visualized menu; and in the entire communication process, the user can communicate with the call center by visually operating the menu provided by the call center instead of receiving and operating the voice menu, thus facilitating the operation of the user. In addition, because the menu sent by the call center in the method of this embodiment is the same as that sent in a method of an existing technology, i.e., they are both a voice menu, and the menu is visualized by the audio and video client, thereby providing compatibility with existing call centers of a plurality of enterprises.

BRIEF DESCRIPTION OF THE DRAWINGS

To describe the technical solutions of the embodiments of the present disclosure or the existing technology more clearly, the following briefly introduces the accompanying drawings required for describing the embodiments or the existing technology. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

Terms such as "first", "second", "third", and "fourth" in the specification, claims, and the foregoing drawings of the present disclosure are used for distinguishing similar objects, but are not necessarily used to describe a specific sequence or a precedence order. It should be understood that the terms used in this way are interchangeable in appropriate cases, so that the embodiments of the present disclosure can be implemented, for example, in other orders than those illustrated or described herein. In addition, the terms "comprise", "include" and any variants thereof are intended to cover the non-exclusive inclusion. For example, a process, method, system, product, or device that includes a series of steps or units is not necessarily limited to those steps or units, but may include other steps or units not expressly listed or inherent to such a process, method, product, or device.

Figure 1:
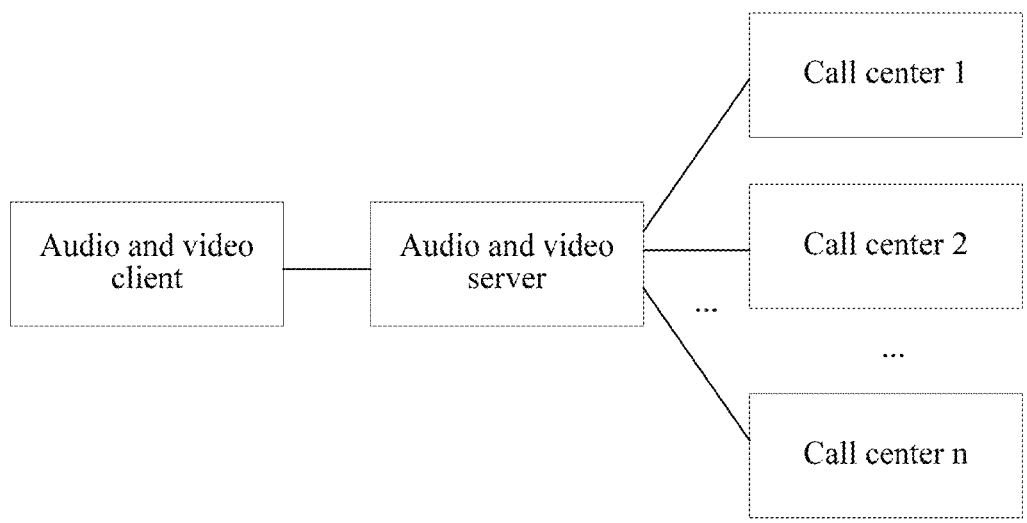
FIG. 1 is a schematic structural diagram of a system for communicating with a call center according to an embodiment of the present disclosure.

Provided is a method for communicating with a call center, mainly applied to a system for communicating with a call center as shown in FIG. 1. The system includes an audio and video client and an audio and video server. The audio and video client can be connected to a call center of at least one enterprise (FIG. 1 shows a plurality of call centers as an example) by using the audio and video server. The audio and video client is mainly a client supporting audio and video communication, for example, an instant messaging client or a standalone VOIP application running on a client device. The audio and video server is a server corresponding to the audio and video client and can provide various audio and video communication services (e.g., a server for an instant messaging application). The call center is a platform connected to an MGW (Media Gateway) and an MGCF (Media Gateway Control Function) gateway in an operator PSTN (Public Switched Telephone Network) network and responsible for processing related SIP (Session Initiation Protocol) signaling and voice rich media streams. The call centers are optionally provided by one or more call center service providers operating call center servers. The call center servers are separate and independently operated from the audio and video server (e.g., the instant messaging server providing the VOIP function to the client devices), and audio and video server serve as an interface with added services between the call center servers and the client devices. The client devices can also call the call center directly without going through the audio and video server, in a conventional manner.

Figure 2:
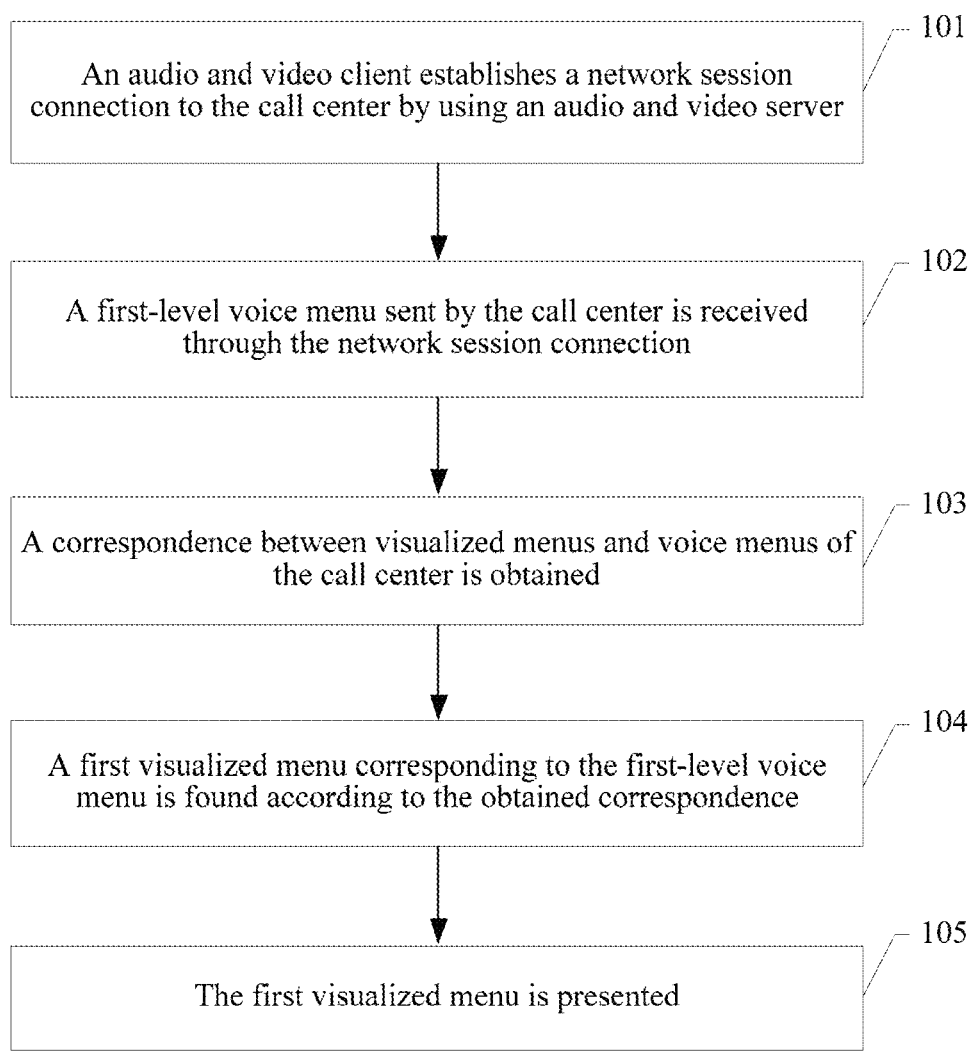
FIG. 2 is a flowchart of a method for communicating with a call center according to an embodiment of the present disclosure.

The method of this embodiment is a method performed by the audio and video client in the system. FIG. 2 is a flowchart of the method, including the following steps:

Step 101. An audio and video client establishes a network session connection to the call center by using an audio and video server.

It should be understood that after the audio and video client connects to the audio and video server, a user may initiate a network session connection request by operating the audio and video client, to request the audio and video client to connect to a call center and perform a network session. After receiving the network session connection request, the audio and video server may separately establish a network session connection to the audio and video client and a network session connection to the call center (e.g., the audio and video server acts as the interface between the audio and video client and the call center server). In this way, a network session connection is established between the audio and video client and the call center by using the audio and video server.

Step 102. A first-level voice menu (e.g., in the form of a voice audio stream or an audio file) sent by the call center is received through the network session connection between the audio and video server and the call center server. The first-level voice menu is any level of voice menu in a plurality of levels of voice menus provided by the call center. For example, the first-level voice menu is a root-level voice menu for call center services provided by the call center. The audio and video server forwards the first-level voice menu to the audio and video client.

After the network session connection is established, the call center sends the voice menu on a per-level basis to the audio and video client through the network session connection between the audio and video server and the audio and video client.

Step 103. A correspondence between visualized menus and voice menus of the call center is obtained.

The correspondence is configured by the audio and video server, and may be specifically a lightweight data interchange format (JavaScript Object Notation, JSON) file, an Extensive Markup Language (XML) file, or the like. The audio and video client may directly download the correspondence from the audio and video server. For example, the audio and video client sends the call center's phone number or name to the audio and video server, and receives one or more visual menu templates for the audio menus associated with the call center, and when the audio menu is transmitted from the audio and video server to the audio and video client, the audio and video server also processes the audio menu to determine which level of the menu hierarchy that the call center is sending to the client device, and sends the menu's ID and textual content to the client device along with the audio menu. The client device retrieves the menu template for the audio menu and populates the menu template with the textual content received from the audio and video server. In some embodiments, the menu template also includes slots for presenting dynamic content (e.g., image, video, interactive content) that is downloaded from the audio and video server or a third-party server (e.g., a content provider server), in addition to slots for presenting the textual version of the menu options of the audio menu.

Step 104. A first visualized menu corresponding to the first-level voice menu is found according to the correspondence obtained in step 103. For example, the audio and video client generates the first visualized menu by filling out the menu template corresponding to the ID of the menu with the textual content of the menu that have been received from the audio and video server. In some embodiments, the menu template includes embedded code/scripts for detecting interactions with the different slots of the menu for filling in the menu options of the menu, and sending the identifier of the slot or menu option back to the audio and video server to be forwarded to the call center server, or directly back to the call center server in the format acceptable by the call center server. For example, the selection of the user will include an identifier of the call to the call center, and the option that is selected by the user through the visualized menu. In some embodiments, the first visualized menu is generated by the audio and video server using the appropriate menu template and the textual content extracted from the voice menu, and sent to the audio and video client. In some embodiments, the audio and video server stores visualized menu for each menu level of the call center, and does a version comparison of the audio file or audio stream received from the call center to determine if the audio menu has changed, if the menu has not changed, the stored visualized menu is identified and sent to the audio and video client, and if the menu has changed (e.g., based on analysis of the audio file or stream), the audio and video server performs the analysis on the audio menu to determine the structure of the menu (e.g., number of options, and textual content of the menu for each option).

Step 105. The first visualized menu is presented. Specifically, information about at least one option included in the first visualized menu may be displayed on a user interface. Each option represents one function, for example, a function of uploading a form, uploading a photograph, or uploading rich media such as audio/video. Displayed information about an option may be a name of the function represented by the operation. In this way, the user can select information about any option, to initiate the transmission of a next level of voice menu of the first-level voice menu next. In some embodiments, the user interface for the VOIP call displays an identifier of the call center, and displays various buttons for the different options in the currently played menu. In some embodiments, the user interface also displays a hierarchy of menu options that have been transmitted to the client device through previous interaction with the higher-level menus. In some embodiments, the hierarchy of menu options are displayed in a collapsed state, showing only the menu of a currently selected upper level option in a fully expanded state, while the menus of options in the upper levels of the menu hierarchy and optionally menus of options in the lower levels of the menu hierarchy are shown in a non-expanded state. For example, when the call is initially connected and the root menu is transmitted to the audio and video client, the user interface displays all of the options in the root menu concurrently. When the user has selected a first option in the root menu using the user interface, a first level menu that corresponds to the first option is received by the audio and video client and all the options in the first level menu are concurrently displayed on the user interface. The first level of the menu hierarchy includes multiple first-level menus, each corresponding to a respective option in the root menu. When the first option in the root menu is selected, only the first level menu that corresponds to the first option is displayed, and the other first level menus are not received or displayed in the user interface. In some embodiments, the first option is also displayed on the user interface as a representation of the root menu, so that the user can easily redisplay the root menu (e.g., ceasing to display the first level menu options corresponding to the first option on the user interface) and cancel the selection of the first option by tapping on the first option on the user interface. In other words, the display of the first option is representing the whole root menu, rather than the first option itself, at this point. If the user selects, in the user interface, a second option in the first level menu corresponding to the first option in the root menu, the second level menu above the root menu and the first level menu that corresponds to the selected second option in the first level menu is received by the audio and video client and all the options in the second level menu that corresponds to the second option are concurrently displayed on the user interface. In some embodiments, the first option is also displayed on the user interface as a representation of the root menu and the second option is also displayed on the user interface as a representation of the first level menu that corresponds to the first option, so that the user can easily redisplay the root menu (e.g., ceasing to display the second level menu options on the user interface) and cancel the selection of the first option and second option by tapping on the first option shown on the user interface. the user can also easily redisplay the first level menu that corresponds to the first option (e.g., ceasing to display the second level menu options on the user interface) and cancel the selection of the second option by tapping on the second option shown on the user interface. In other words, the display of the first option is representing the whole root menu, rather than the first option itself, at this point, and the display of the second option is representing the entire first level menu that included the second option. This is a function that is not available on the audio menu of the conventional call center. In the conventional call center, the user would have to use a "back" option in the current menu to navigate back to the level immediately above the current level, as opposed to navigating to any level above the current level by a single selection input on the visual user interface (e.g., tapping on the option that is representing an entire menu in a respective level in the menu hierarchy). In some embodiments, in response to a selection of a level above the current menu level (e.g., a tap on the representation of an upper level menu), all of the menu options in the upper level menu are redisplayed, and the currently displayed menu is collapsed or ceases to be displayed. In some embodiments, the user can choose to review the menu options in a previously displayed upper level or lower level menu again in the user interface (e.g., in a pop-up window overlaid on the user interface next to an option corresponding to a chain of options that has been selected previously) without actually selecting the option corresponding to the upper or lower menu level or causing the selection to the sent to the call center. For example, if option a is selected in the root menu (e.g., including options a, b, c, each corresponding to menus A, B, C in the first level of menus in the menu hierarchy), and options in menu A (e.g., options i, ii, iii corresponding to menus I, II, and III, respectively) are displayed with option a (e.g., option a is displayed as a representation of the root menu while the root menu ceases to be displayed). When option ii is selected in menu A, options in menu II (e.g., options x, y, z) are displayed with option a and option ii (e.g., option a is displayed as a representation of the root menu and option ii is displayed as a representation of the first level menu corresponding to option a (e.g., menu A)). If the user selects option a at this point, the root menu (e.g., including options a, b, c) is redisplayed and the menu A and menu II ceases to be displayed. If the user hover over or touch-hold over option a in the root menu (rather than tapping on option a or pressing on option a), a pop-up window will be displayed overlaid on the user interface, showing menu A and menu II in a hierarchy (but no showing other menus in the same levels in the hierarchy) (the options in the menus are not activatable in the pop-up window). If there are other options that are previously selected in the menu hierarchy, the corresponding menus are also reviewable on the user has navigated to other levels of other menus in the same level by hovering over an option in the chain of selection for the menus.

Further, to facilitate the operation of the user on the first visualized menu, when presenting the first visualized menu, the audio and video client may play the information about the at least one option in a voice manner while displaying the information of each option. The information may include specific content (for example, a name of the function represented by the operation) of each option, or prompt information about an operation on each option.

Further, the audio and video client not only can receive the voice menu sent by the call center through steps 101 to 105, but also can receive a message actively pushed by the call center. Specifically, the audio and video client receives a push message sent by the call center, the push message including any one of the following messages: a notification message, a comment interface message, a service processing result, and a rich media message. It should be noted that, the push message may be received through another link other than the network session connection. For example, the push message may be received through a SMS connection or HTTP or HTTPS connection between the call center and the client device bypassing the audio and video server.

Based on the above, in the method of this embodiment, an audio and video client receives, through a network session connection, a first-level voice menu sent by a call center, finds a first visualized menu corresponding to the first-level voice menu according to a correspondence between visualized menus and voice menus of the call center, and presents the first visualized menu. Hence, a user can communicate with the call center by directly operating the first visualized menu; and in the entire communication process, the user can communicate with the call center by visually operating the menu provided by the call center instead of receiving and operating the voice menu, thus facilitating the operation of the user. In addition, because the menu sent by the call center in the method of this embodiment is the same as that sent in a method of an existing technology, i.e., they are both a voice menu, and the menu is visualized by the audio and video client, thereby providing compatibility with existing call centers of a plurality of enterprises.

Figure 3:
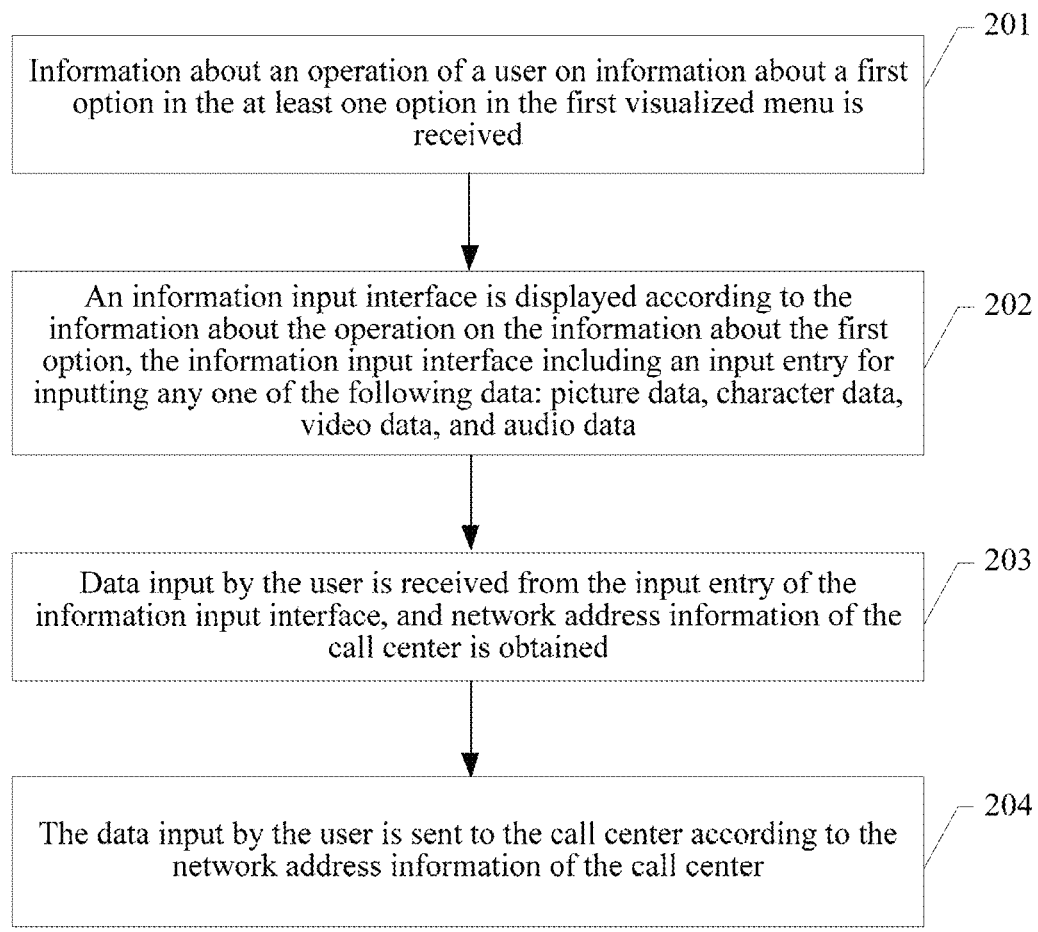
FIG. 3 is a flowchart of a method for communicating with a call center according to an embodiment of the present disclosure.

In a specific embodiment, after the audio and video client presents the first visualized menu, the user can directly operate the first visualized menu to implement communication with the call center. Specifically, the following two manners may be used:

(1) Referring to FIG. 3, for an operation on one type of option (that is, the first option) in the first visualized menu, the audio and video client may perform the following steps:

Step 201. Information about an operation of a user on information about a first option in the at least one option in the first visualized menu is received.

The first option is any option in the first visualized menu.

Step 202. An information input interface is displayed according to the information about the operation on the information about the first option, the information input interface including an input entry for inputting any one of the following data: picture data, character data, video data, and audio data.

Step 203. Data input by the user is received from the input entry of the information input interface, and network address information of the call center is obtained.

The network address information of the call center may be configured to the audio and video client by the audio and video server.

Step 204. The data input by the user is sent to the call center according to the network address information of the call center.

The data input by the user may be directly sent to the call center by the audio and video client, without passing through the audio and video server.

Figure 4:
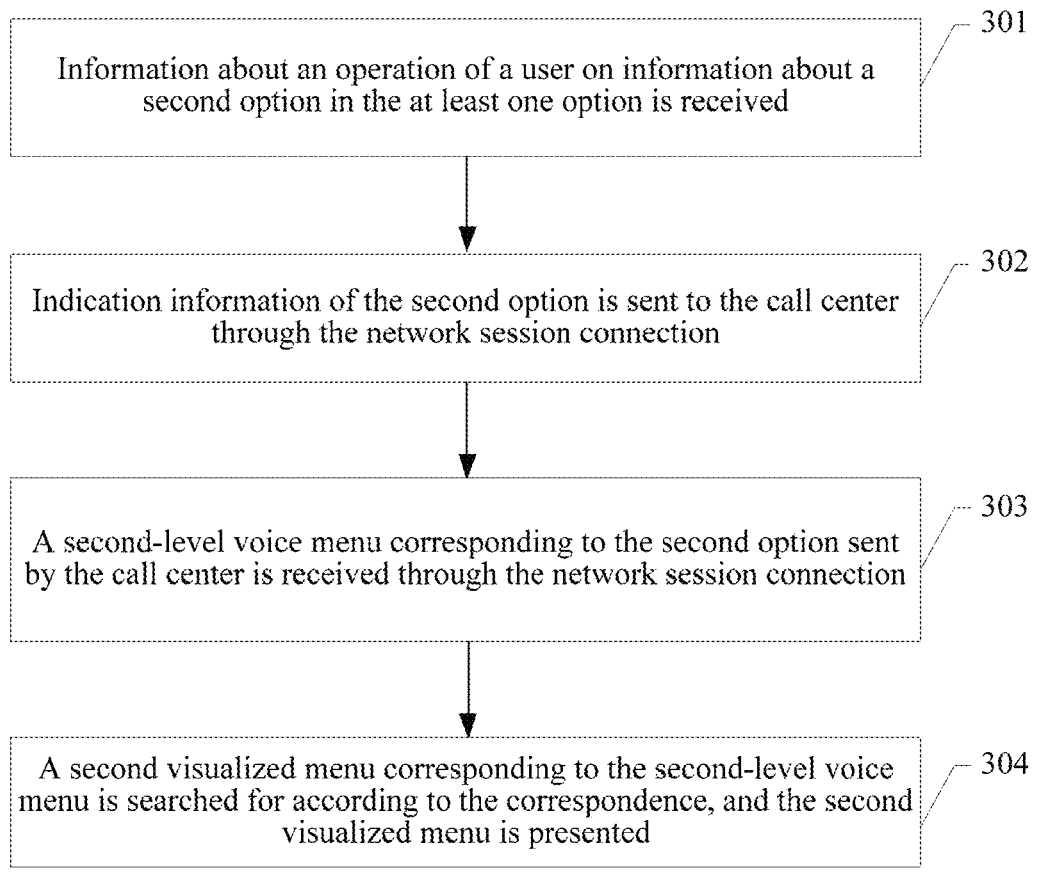
FIG. 4 is a flowchart of a method for communicating with a call center according to an embodiment of the present disclosure.

(2) Referring to FIG. 4, for an operation on another type of option (that is, the second option) in the first visualized menu, the audio and video client may perform the following steps:

Step 301. Information about an operation of a user on information about a second option in the at least one option is received.

Step 302. Indication information about the second option is sent to the call center through the network session connection.

It should be understood that generally, after the user establishes a voice session connection to the call center by using a phone terminal, the call center sends a voice menu to the phone terminal, and after the user selects an option in the voice menu by using the phone terminal, the phone terminal sends indication information about the selected option to the call center, thus implementing the communication between the phone terminal and the call center.

In this embodiment of the present disclosure, to provide compatibility with various call centers without making any modification to existing call centers, the audio and video client sends the indication information about the selected option to the call center through the network session connection, so that the call center can identify the information sent by the audio and video client, and then perform subsequent processing.

The indication information about the second option may be information about a dual-tone multi frequency (DTMF) key. In this embodiment, each option in the first visualized menu corresponds to one DTMF key.

Step 303. A second-level voice menu corresponding to the second option sent by the call center is received through the network session connection. The second-level voice menu is a next level of voice menu of the first-level voice menu.

Step 304. A second visualized menu corresponding to the second-level voice menu is searched for according to the correspondence, and the second visualized menu is presented. A method for presenting the second visualized menu may be the same as the foregoing method for presenting the first visualized menu, and will not be described in detail herein again.

Figure 5:
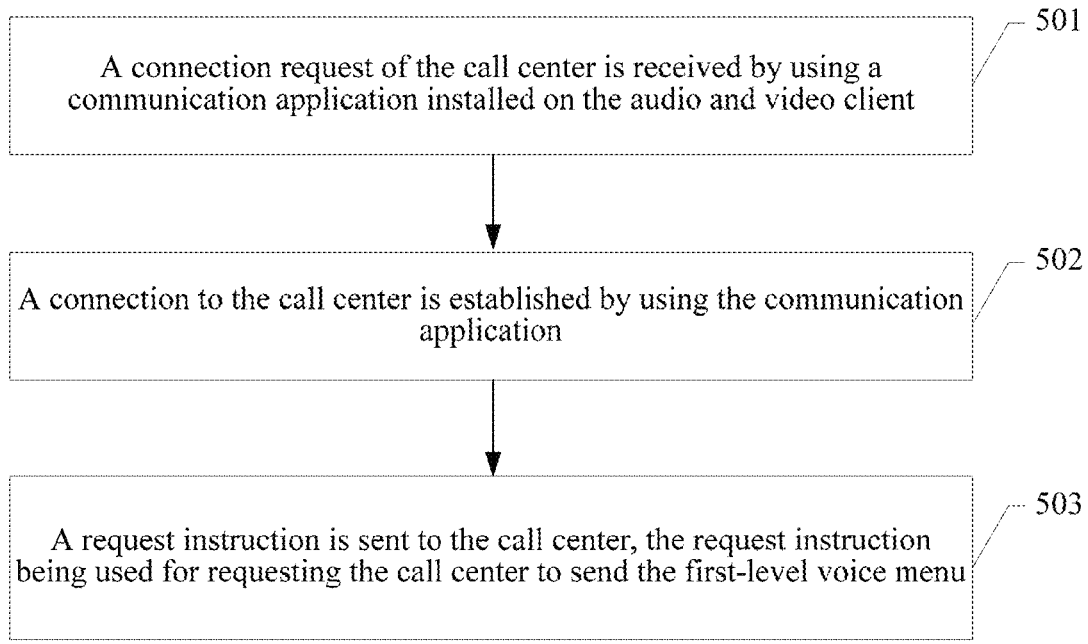
FIG. 5 is a flowchart of a method for establishing a network session connection in a method for communicating with a call center according to an embodiment of the present disclosure.

FIG. 5 is a flowchart of a method for establishing a network session connection in the method for communicating with a call center according to Method Embodiment 1 of the present disclosure. As shown in FIG. 5, the establishing, by an audio and video client, a network session connection to the call center by using an audio and video server includes the following steps:

Step 501. A connection request of the call center is received by using a communication application installed on the audio and video client.

Step 502. A connection to the call center is established by using the communication application.

The communication application is an application for implementing event interaction. The communication application may have a voice communication function. The communication application obtains voice information by transmitting voice data between terminals by using the voice communication function, and performs event interaction by using the voice information. An event in the communication application is an event used for satisfy a service requirement of a user terminal, for example, a service in Consumer to Business (C2B) business mode.

For example, the communication application is an instant messaging application, and the call center provides an enterprise merchant service. The instant messaging application performs interaction of an enterprise merchant service by using an enterprise phone number. The instant messaging application directly dials a customer service hotline of the enterprise, obtains voice prompt information of an agent, and performs interaction between the user terminal and the service provided by the enterprise merchant by using the voice prompt information of the agent. This process only needs to consume traffic, and free calls can be made via Wireless Fidelity (WiFi), reducing the costs. The enterprise merchant service in the instant messaging application may include various services such as an express service, bank service, airline ticket service, car rent service, post-sales service, designated driver service, travel service, and insurance service. The enterprise merchant service in the instant messaging application is displayed on an interface of the instant messaging application in the form of graph information plus text information, making it convenient for the user terminal to query different services. The user terminal can use a search box in the uppermost part of the communication application to search for a service that is not displayed on the interface of the instant messaging application, so as to query a service of a target merchant of the communication application.

Step 503. A request instruction is sent to the call center, the request instruction being used for requesting the call center to send the first-level voice menu.

After the target merchant of the instant messaging application is found, a request instruction is received through a service operation page of the target merchant. The service operation page is a page for performing an operation on the service of the target merchant, for example, an official account AIO interface or an enterprise merchant information card. The service operation page includes prompt information about an operation on an event. For example, a phone icon is used to prompt the user terminal to dial the customer service hotline of the enterprise merchant, website information is used to prompt the user terminal to query a service website of the enterprise merchant, and so on. The request instruction is used for indicating that the instant messaging application requests to obtain service data corresponding to the enterprise merchant service, and may be a touch signal of the user terminal on the service operation page. When the touch signal is received in a particular region on the service operation page, the instant messaging application may immediately request to respond to the touch signal, to request to obtain the service data corresponding to the service of the target merchant. For example, when the call center is a call center of an express enterprise, the user terminal taps "Phone number of the instant messaging application" or an icon "Phone number of the instant messaging application" in an official account AIO interface of an express enterprise or a merchant information card of an express enterprise to generate a touch signal, and the service operation page receives the touch signal and then instructs the communication application to request to obtain service data corresponding to the express enterprise.

Figure 6:
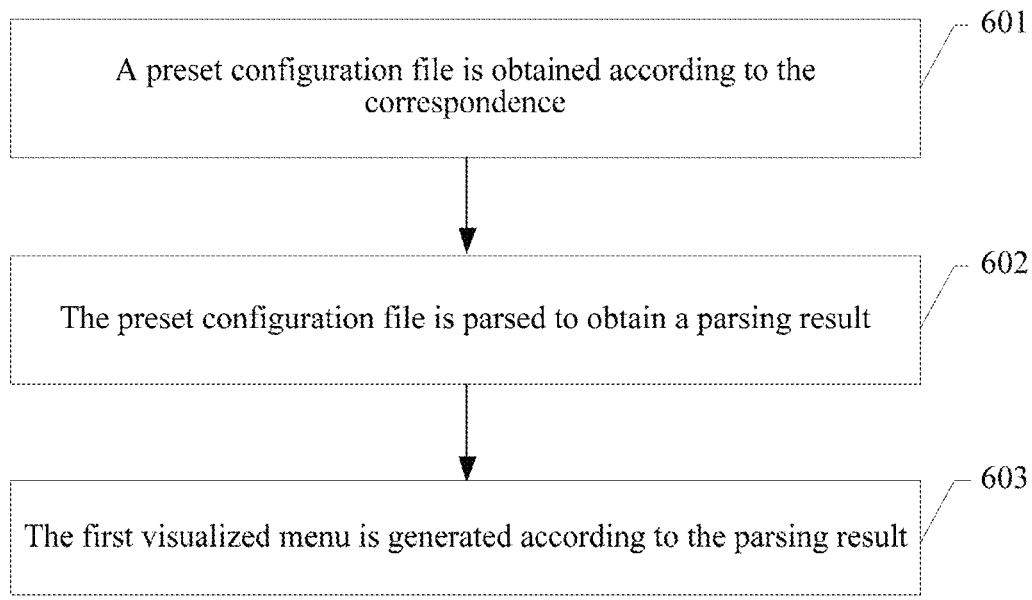
FIG. 6 is a flowchart of obtaining a first visualized menu in a method for communicating with a call center according to an embodiment of the present disclosure.

FIG. 6 is a flowchart of obtaining a first visualized menu in the method for communicating with a call center according to Method Embodiment 1 of the present disclosure. As shown in FIG. 6, searching for a first visualized menu corresponding to the first-level voice menu according to the correspondence, specifically includes the following steps:

Step 601. A preset configuration file is obtained according to the correspondence.

The preset configuration file is a file for configuring a service menu corresponding to the call center. In some embodiments, a configuration system provides a configuration page for configuring data of a visualized menu. The configuration system saves menu data configured by the system as a configuration file in the format of a lightweight data interchange format (JavaScript Object Notation, JSON) file, an Extensive Markup Language (XML) file, the configuration file providing Interactive Voice Response (IVR) menu content and other information of an enterprise merchant. The IVR menu can enter a service center by means of a phone, and plays, according to content input by the user terminal, voice information related to the input. The preset configuration file can be automatically uploaded to the IVR visualized menu server. The IVR visualized menu server stores the configuration file in the JSON or XML format of the IVR configuration menu. Each enterprise merchant corresponds to one configuration file. In a visualized menu page of the communication application, the preset configuration file is pulled from the IVR visualized menu server by using a common gateway interface (CGI).

Step 602. The preset configuration file is parsed to obtain a parsing result.

After the preset configuration file is obtained from the IVR visualized menu server, the preset configuration file is parsed to obtain a parsing result. The parsing result may be configuration data of the visualized menu.

Step 603. The first visualized menu is generated according to the parsing result.

The visualized menu page is rendered according to the parsing result. The visualized menu page is generated according to the parsing result, so that the visualized menu of the communication application can be controlled for an operation such as a tap or switching event, thereby reducing the event interaction time of the application.

For example, when the user terminal taps a service menu, a configuration file of a visualized menu is read from a server, configuration data of the visualized menu is obtained, and then a visualized menu page is generated. The user terminal may choose to present a next-level menu, or go back to the previous-level menu, or jump to a page defined by a target event, or enter a manual service page according to the type of the visualized menu, thereby reducing the event interaction time of the application.

Figure 7:
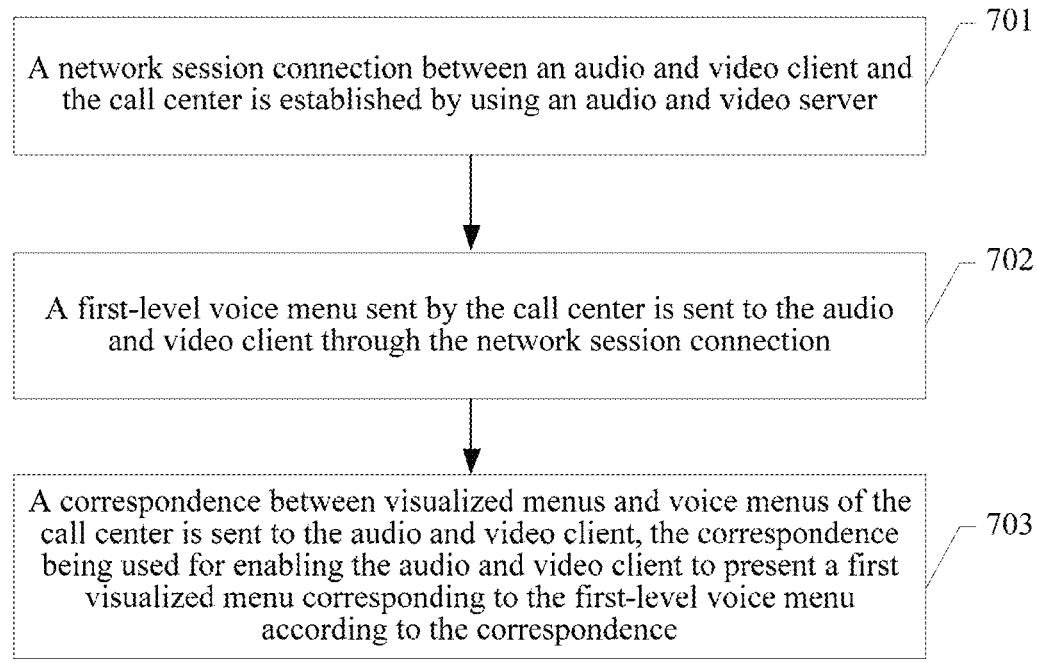
FIG. 7 is a flowchart of a method for communicating with a call center according to an embodiment of the present disclosure.

Provided is a method for communicating with a call center, mainly applied to the system for communicating with a call center as shown in FIG. 1. The method of this embodiment is a method performed by the audio and video server in the system. FIG. 7 is a flowchart of the method, including the following steps:

Step 701. A network session connection between an audio and video client and the call center is established by using an audio and video server.

After the audio and video client connects to the audio and video server, a user may initiate a network session connection request by operating the audio and video client, to request the audio and video client to connect to a call center and perform a network session. After receiving the network session connection request, the audio and video server may separately establish a network session connection to the audio and video client and a network session connection to the call center. In this way, a network session connection is established between the audio and video client and the call center by using the audio and video server.

Step 702. A first-level voice menu sent by the call center is sent to the audio and video client through the network session connection.

After the network session connection is established, the call center sends the voice menu on a per-level basis to the audio and video client through the network session connection. In this process, the audio and video server is responsible for forwarding information between the call center and the audio and video client.

Step 703. A correspondence between visualized menus and voice menus of the call center is sent to the audio and video client, the correspondence being used for enabling the audio and video client to present a first visualized menu corresponding to the first-level voice menu according to the correspondence. A specific method used by the audio and video client to present the first visualized menu may be the same as that described in the foregoing method embodiment, and will not be described in detail herein again.

Specifically, the correspondence is configured by the audio and video server and sent to the audio and video client. The correspondence may be specifically a JSON file, an XML, file, or a file in other format.

It should be noted that step 403 and steps 401 and 402 are not limited to a particular order, and may be performed concurrently or in sequence. FIG. 5 merely shows one of specific implementations.

Further, the audio and video server may receive a push message sent by the call center, and send the push message to the audio and video client, the push message including any one of the following messages: a notification message, a comment interface message, a service processing result, and a rich media message. It should be noted that, the push message may be forwarded to the audio and video client without passing through the network session connection.

In the method of this embodiment, after the network session connection between the audio and video client and the call center is established by using the audio and video server, the audio and video server forwards, to the audio and video client, the first-level voice menu sent by the call center, and sends the correspondence between visualized menus and voice menus of the call center to the audio and video client, making it convenient for the audio and video client to present the first visualized menu corresponding to the first-level voice menu. Hence, a user can communicate with the call center by directly operating the first visualized menu presented by the audio and video client; and in the entire communication process, the user can communicate with the call center by visually operating the menu provided by the call center instead of receiving and operating the voice menu, thus facilitating the operation of the user. In addition, because the menu sent by the call center in the method of this embodiment is the same as that sent in a method of an existing technology, i.e., they are both a voice menu, and the menu is visualized by the audio and video client, thereby providing compatibility with existing call centers of a plurality of enterprises.

It should be noted that, after the audio and video client presents the first visualized menu, the user can directly operate the first visualized menu to implement communication with the call center. Specifically, the first visualized menu may include information about at least one option. There are mainly two types of options:

(1) In one case, when the user performs an operation on one type of option (that is, the second option), the transmission of a next level of voice menu of the first-level voice menu, that is, the second-level voice menu, may be directly triggered.

In this case, the audio and video server sends, to the call center through the network session connection, indication information about the second option selected by the user that is sent by the audio and video client, and then sends, to the audio and video client through the network session connection, a second-level voice menu corresponding to the second option that is sent by the call center, the second-level voice menu being used by the audio and video client to present a second visualized menu corresponding to the second-level voice menu according to the correspondence.

(2) In another case, when the user performs an operation on another type of option (that is, the first option) in the first visualized menu, the audio and video client may be triggered to directly send the data input by the user to the call center.

In this case, the audio and video server needs to configure network address information of the call center to the audio and video client, the network address information of the call center being used for enabling the audio and video client to send the data input by the user to the call center according to the network address information, and the data input by the user includes any one of the following data: picture data, character data, video data, audio data, and other rich media data. In this way, the data input by the user from the audio and video client can be directly sent to the call center, and does not need to be sent to the call center through the above-mentioned network session connection.

Figure 8:
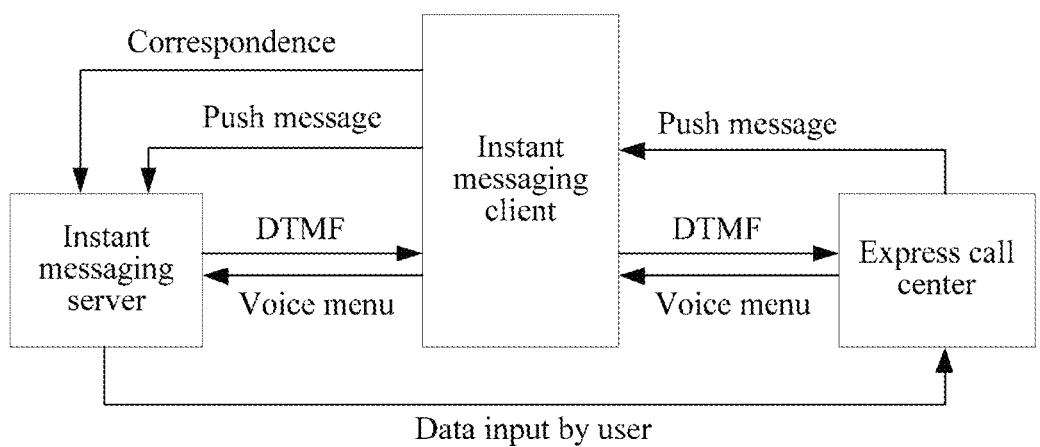
FIG. 8 is a schematic structural diagram of a system for communicating with a call center according to an embodiment of the present disclosure.
Figure 9:
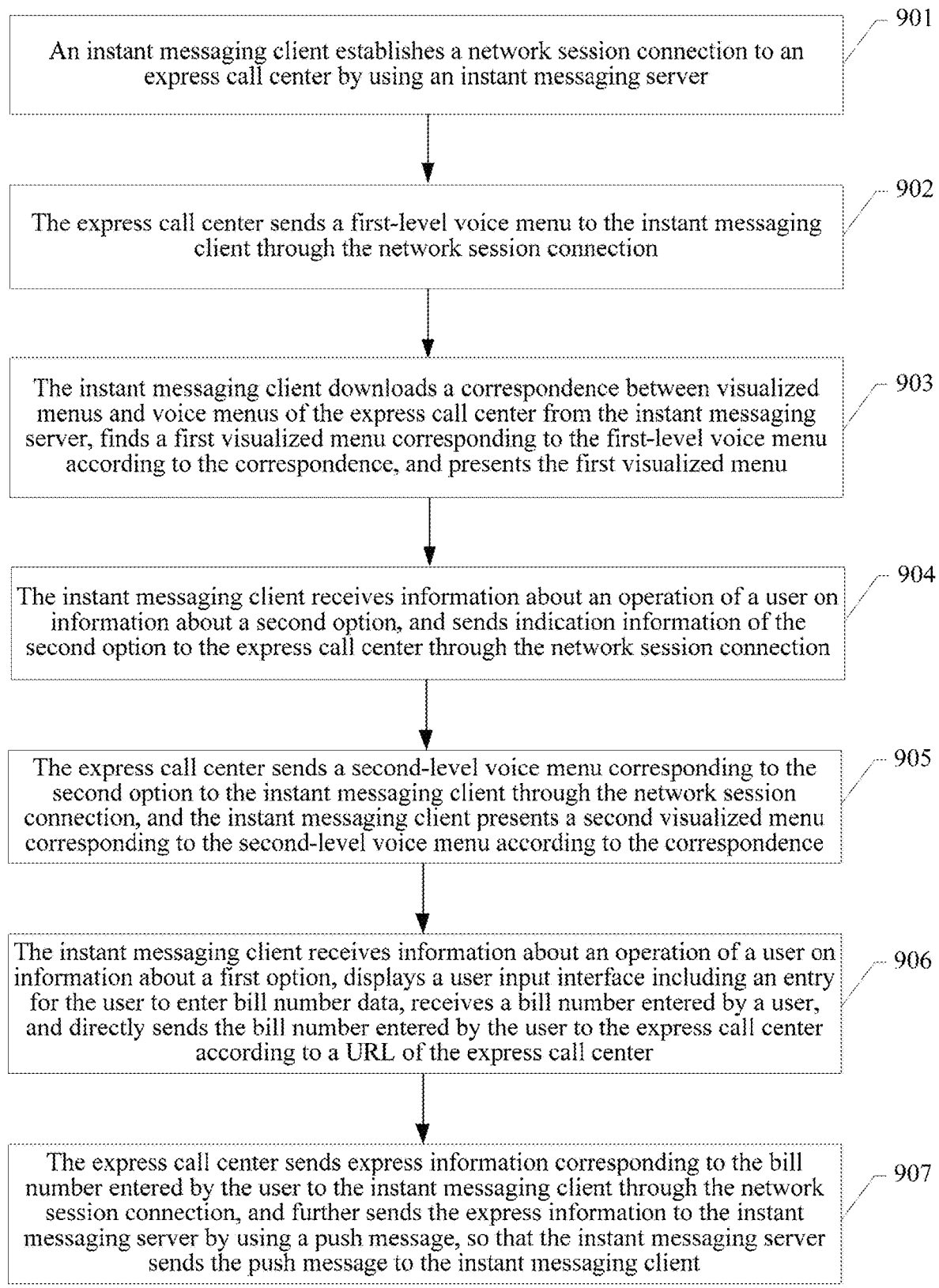
FIG. 9 is a flowchart of a method for communicating with a call center according to an embodiment of the present disclosure.

Provide is a specific application example of the method for communicating with a call center. Referring to FIG. 8, in this embodiment, the audio and video client and the audio and video server are respectively an instant messaging client and an instant messaging server, and the call center is a call center of an express enterprise. FIG. 9 is a flowchart of a method for communicating with the express call center according to this embodiment, including the following steps:

Step 901. The instant messaging client establishes a network session connection to the express call center by using the instant messaging server.

After the instant messaging client establishes a network connection to the instant messaging server, the instant messaging server may provide a network connection interface to the instant messaging client, the network connection interface including a button for initiating a network session connection to the express call center. When the user taps the button, the instant messaging client sends a network session connection request to the instant messaging server, so that after receiving the network session connection request, the instant messaging server separately establishes a network session connection to the instant messaging client and a network session connection to the express call center.

Step 902. The express call center sends a first-level voice menu to the instant messaging client through the network session connection.

Step 903. The instant messaging client downloads a correspondence between visualized menus and voice menus of the express call center from the instant messaging server, finds a first visualized menu corresponding to the first-level voice menu according to the correspondence, and presents the first visualized menu.

Figure 10A:
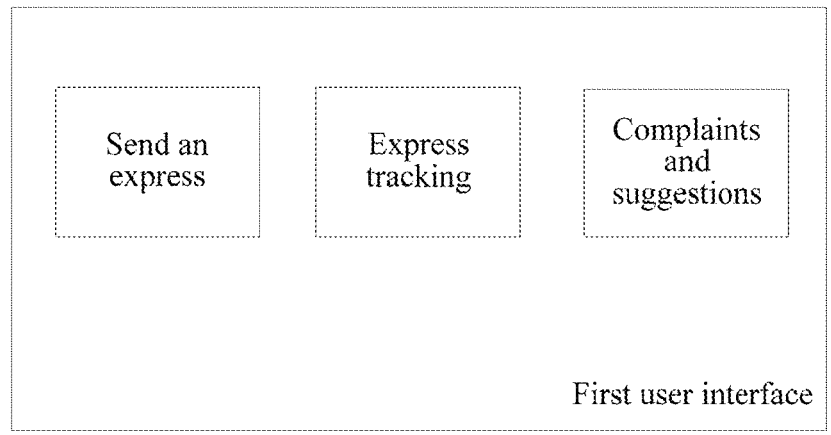
FIG. 10a is a schematic diagram of a first user interface according to an embodiment of the present disclosure.

Specifically, as shown in FIG. 10*a*, when presenting the first visualized menu, the instant messaging client may display information about three options, "Send an express", "Express tracking", and "Complaints and suggestions", on a first user interface, and may further play prompt information of the three options in a voice manner, for example, provide a voice prompt to inform the user how to operate the three options.

Step 904. When the user taps a button "Express Tracking", the instant messaging client receives information about an operation of a user on information about a second option, that is, information about an operation on "Express Tracking", and sends indication information about the second option to the express call center through the network session connection.

It should be noted that, in the existing technology, after a call is made to the express call center by using a phone terminal, each voice option in the first-level voice menu sent by the express call center to the phone terminal corresponds to information about one user operation key. For example, for "Press 2 for express tracking", "2" is information about a user operation key corresponding to the voice option "Express Tracking". After the user enters "2" into the phone terminal, the phone terminal sends a DTMF key corresponding to "2" to the express call center. In this embodiment, to provide compatibility with various existing call centers, each option in the first visualized menu may correspond to one DTMF key. In this way, when sending the indication information about the second option in this step, the instant messaging client may send information about a DTMF key corresponding to the second option.

Step 905. The express call center sends a second-level voice menu corresponding to the second option to the instant messaging client through the network session connection, and the instant messaging client presents a second visualized menu corresponding to the second-level voice menu according to the correspondence.

Figure 10B:
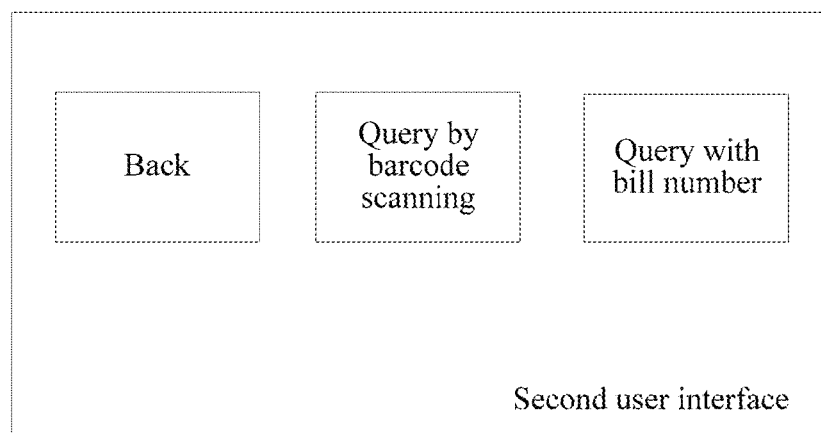
FIG. 10b is a schematic diagram of a second user interface according to an embodiment of the present disclosure.

Specifically, as shown in FIG. 10*b*, when presenting the second visualized menu, the instant messaging client may display information about three options, "Back", "Query by barcode scanning", and "Query with bill number", on a second user interface, and may further play prompt information of the three options in a voice manner, for example, provide a voice prompt to inform the user how to operate the three options.

Figure 10C:
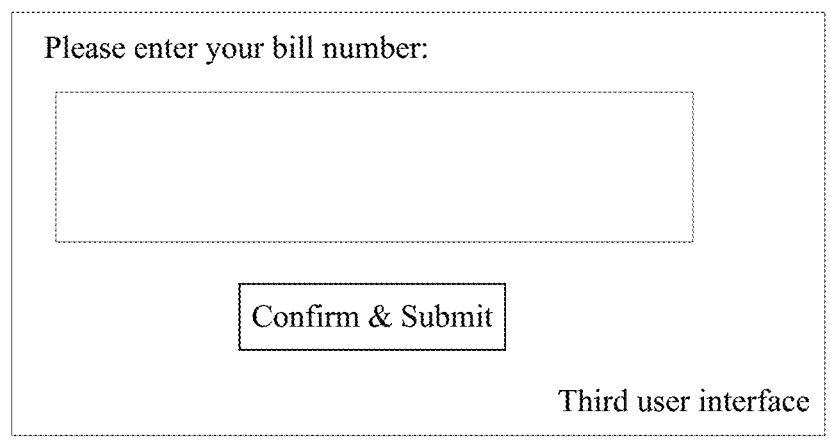
FIG. 10c is a schematic diagram of a third user interface according to an embodiment of the present disclosure.

Step 906. When the user taps a button "Query with bill number", the instant messaging client receives information about an operation of a user on information about a first option, that is, information about an operation on "Query with bill number", and displays a user input interface, for example, a third user interface shown in FIG. 10*c*, the third user interface including an entry for the user to enter bill number data; after the user enters a bill number in the entry and taps a button "Confirm & Submit", the instant messaging client receives, from the third user interface, the bill number entered by the user; the instant messaging client directly sends the bill number entered by the user to the express call center according to a uniform resource locator (URL) of the express call center.

The URL of the express call center is configured by the instant messaging server to the instant messaging client.

Step 907. The express call center may send express information corresponding to the bill number entered by the user to the instant messaging client through the network session connection.

The express call center may further send the express information to the instant messaging server by using a push message, so that the instant messaging server sends the push message to the instant messaging client.

Figure 11A:
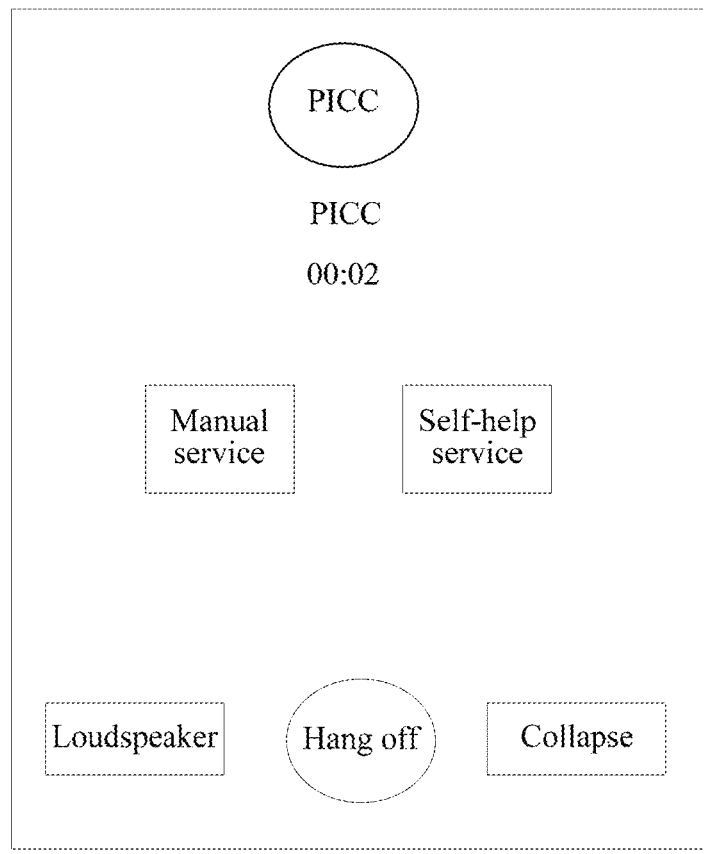
FIG. 11a is a schematic diagram of a user interface displayed on an instant messaging client according to an embodiment of the present disclosure.
Figure 11B:
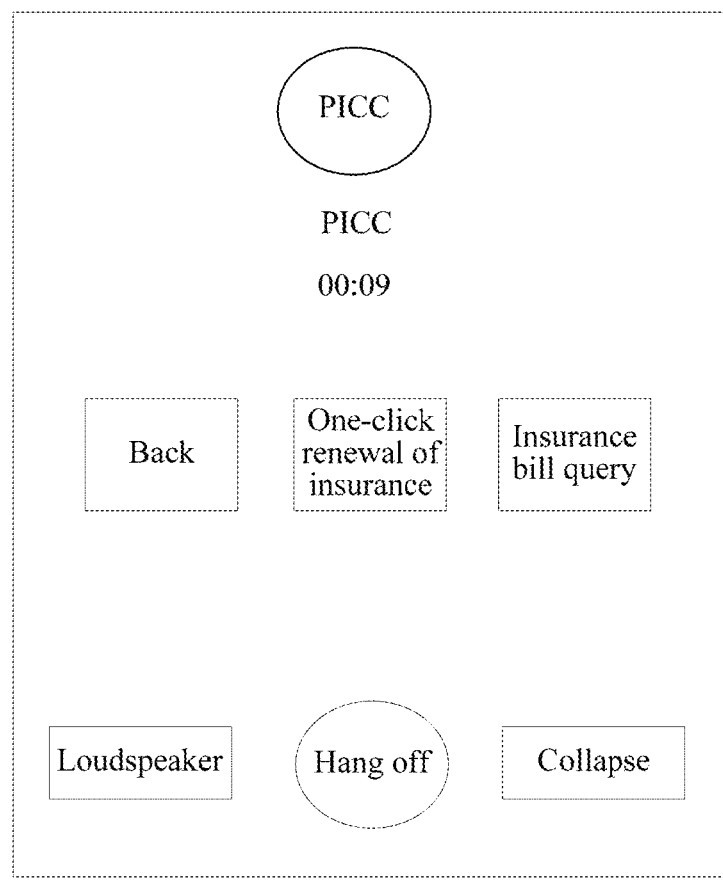
FIG. 11b is a schematic diagram of a user interface displayed on an instant messaging client according to an embodiment of the present disclosure.
Figure 11C:
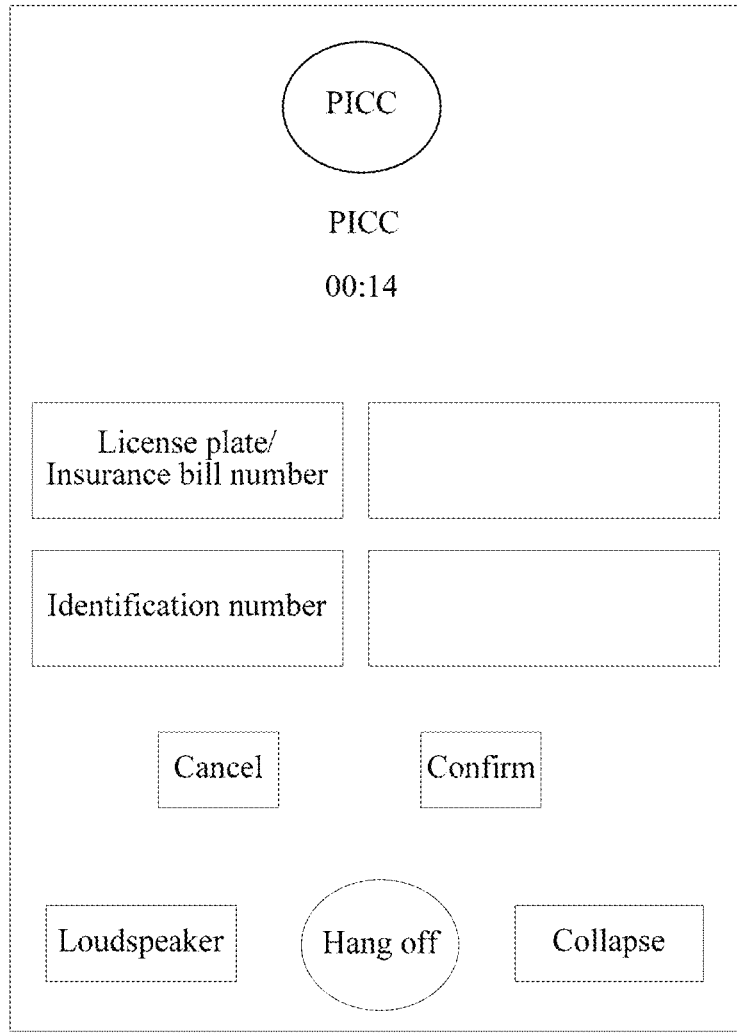
FIG. 11c is a schematic diagram of a user interface displayed on an instant messaging client according to an embodiment of the present disclosure.

Referring to FIG. 11*a* to FIG. 11*c*, after the instant messaging client establishes a network session connection to a call center of China Life Insurance Company (China Life for short), the call center of China Life sends a first-level voice menu to the instant messaging client. In this case, when presenting the first visualized menu, the instant messaging client may display information about two options, "Manual service" and "Self-help service", on a user interface shown in FIG. 11*a*, and may further play prompt information of the two options in a voice manner, for example, provide a voice prompt to inform the user how to operate the two options. In addition, a time (for example, 2 s) for which the network session connection has been established, an end button (that is, a hang off button in FIG. 11*a*) for the network session connection, or the like may further be displayed on the user interface.

When the user taps a button "Manual service", the call center of China Life sends a second-level voice menu to the instant messaging client. In this case, when presenting the second visualized menu, the instant messaging client may display information about three options, "Back", "One-click renewal of insurance", and "Insurance bill query", on a user interface shown in FIG. 11*b*, and may further play prompt information of the three options in a voice manner, for example, provide a voice prompt to inform the user how to operate the three options.

When the instant messaging client receives information about an operation on "Insurance bill query", the instant messaging client displays a user input interface, for example, a user interface shown in FIG. 11*c*, the user interface including an entry for the user to enter a license plate or insurance bill number, and an entry for entering an identification number. After the user respectively enters an insurance bill number and an identification number through the two entries and taps a button "Confirm", the instant messaging client receives the insurance bill number and identification number entered by the user from the user interface. The instant messaging client directly sends the information entered by the user to the call center of China Life according to the URL of the express call center. The call center of China Life sends information about a corresponding insurance bill to the instant messaging client according to the received information.

The technical solutions of the present disclosure will be described below through preferred embodiments.

Figure 12:
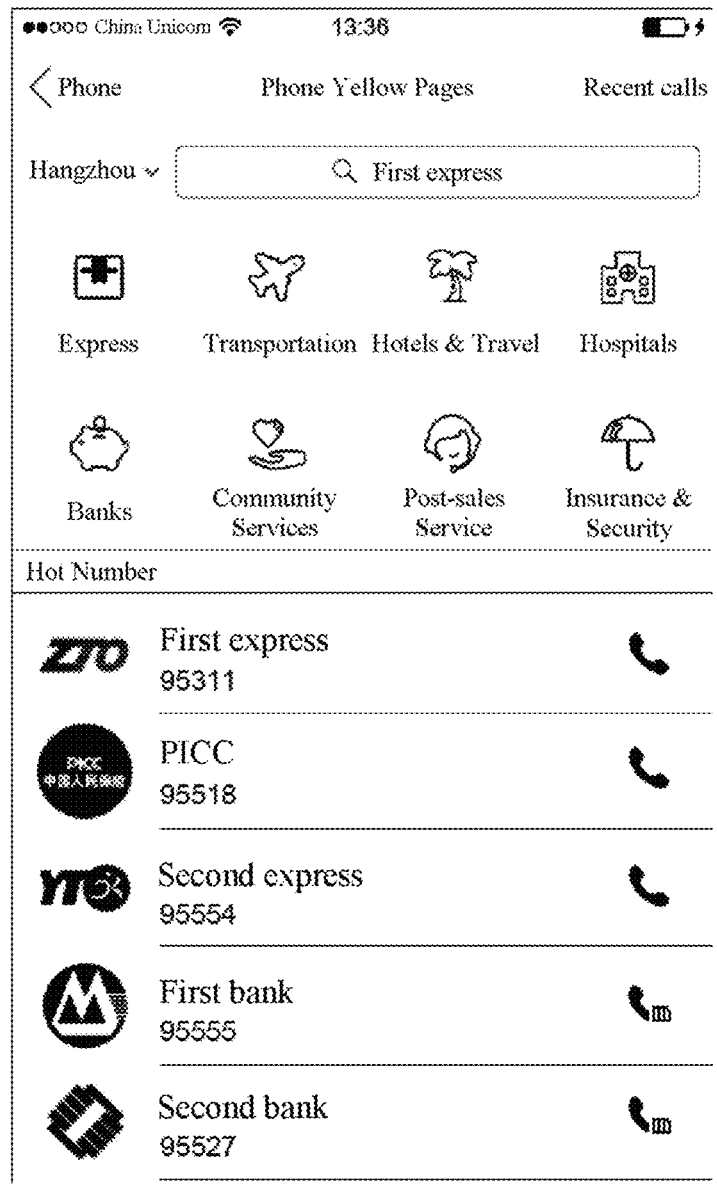
FIG. 12 is a schematic diagram of an operation page of an instant messaging tool according to an embodiment of the present disclosure.

FIG. 12 is a schematic diagram of an operation page of an instant messaging tool according to an embodiment of the present disclosure. As shown in FIG. 12, an operation page of an instant messaging tool is a phone yellow page on a mobile-phone QQ interface, the operation page includes types of services, for example, types of services "Express", "Transportation", "Hotels & Travel", "Hospitals", "Banks", "Community Services", "Post-sales Service", and "Insurance & Security". Below the QQ yellow page, icons of interaction events with highest user attention degrees, for example, icons of interaction events such as first express, China Life, second express, and first bank, are displayed, the icon of each interaction event corresponding to a specific service of the interaction event. On the right of each interaction event, prompt information of performing an operation on the interaction event is provided, the prompt information being a phone icon indicating that a call can be made to the customer service hotline of the interaction event. When China Life is selected, the phone icon on the right of the China Life icon is tapped to cause the instant messaging tool application to generate an instruction to request to obtain service data corresponding to China Life, and enter a state of calling the customer service hotline. In this embodiment, a connection between establish the instant messaging tool application and the call center is established by network voice communication, and the instant messaging tool application directly connects to the call center of China Life by using a VOIP audio/video access function. This call process is implemented via a VOIP network and only needs to consume traffic, free calls can be made via WiFi, and the customer service hotline of the enterprise can be called without using a conventional phone, thereby significantly reducing costs for both the enterprise and the user terminal.

Figure 13A:
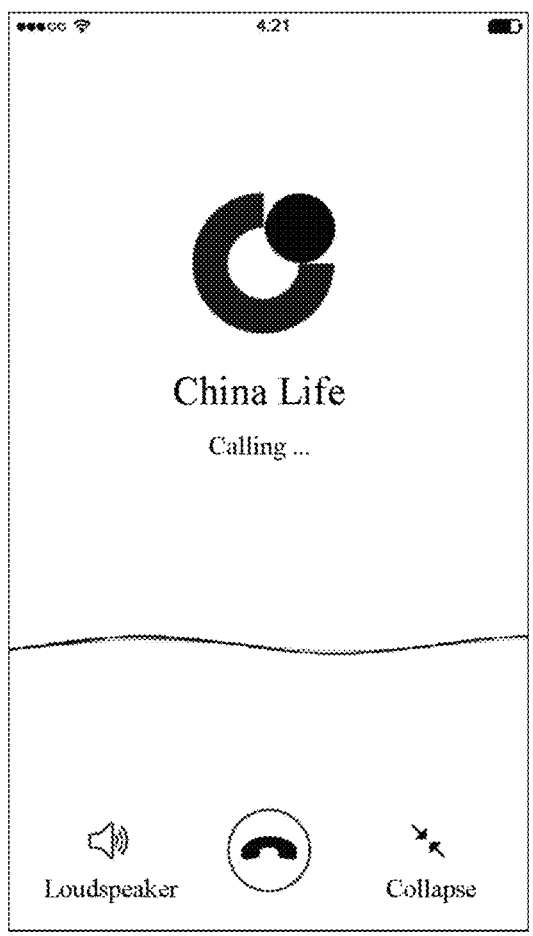
FIG. 13a to FIG. 13j are schematic diagrams of a user interface displayed on an instant messaging client according to an embodiment of the present disclosure.
Figure 13B:
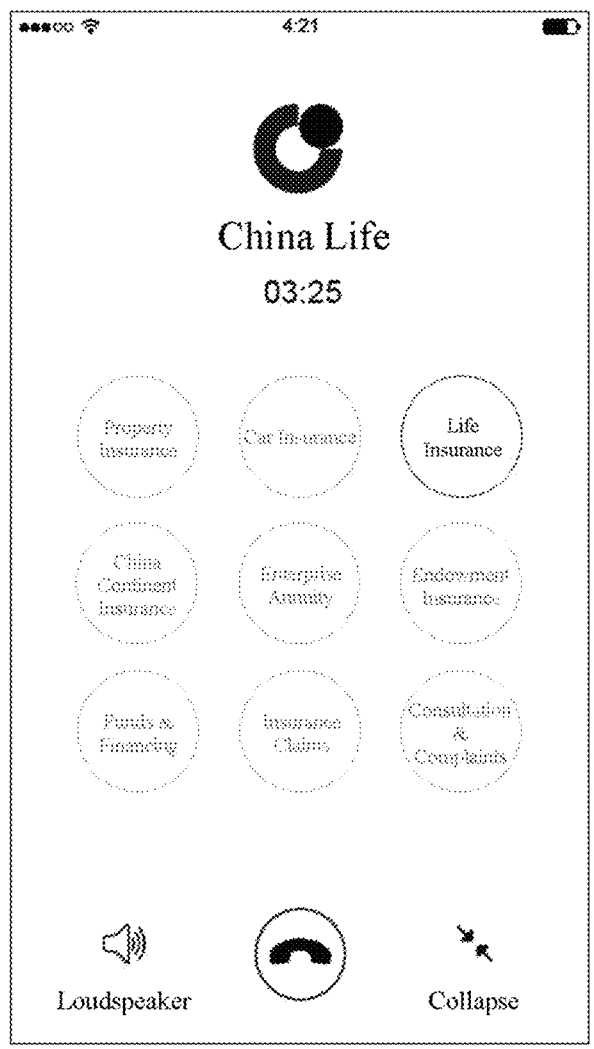

FIG. 13*a* to FIG. 13J are schematic diagrams of another user interface displayed on an instant messaging client according to an embodiment of the present disclosure. In this embodiment of the present disclosure, communication with the call center of China Life is used as an example for description. After the phone icon on the right of the China Life icon is tapped to cause the instant messaging tool application to generate the instruction, the call center of China Life is called. As shown in FIG. 13*a*, prompt information "Calling . . . " is provided to indicate waiting for a response of the call center of China Life. As shown in FIG. 13*b*, after the call to the call center of China Life is put through, a visualized menu interface is displayed. When China Life has nine service menus, for example, "Property Insurance" service menu, "Car Insurance" service menu, "Life Insurance" service menu, "China Continent Insurance" service menu, "Enterprise Annuity" service menu, "Endowment Insurance" service menu, "Funds & Financing" service menu, "Insurance Claims" service menu, and "Consultation & Complaints" service menu, the service menus are presented in the form of 3×3 circles with service names. When the user terminal needs to obtain a life insurance service, the "Life Insurance" service menu is touched. After receiving a touch signal, the "Life Insurance" service menu is identified in a deep color to obtain an identified menu of the "Life Insurance" service menu. Interaction with a service corresponding to China Life is performed by using the identified menu, thus visually providing abundant service functions of the enterprise merchant. The user terminal directly makes a choice without needing to wait for redundant voice playing, and tapping the service menu directly can enable the user terminal to rapidly perform interaction with the service, thereby reducing the event interaction time of the application.

Figure 13C:
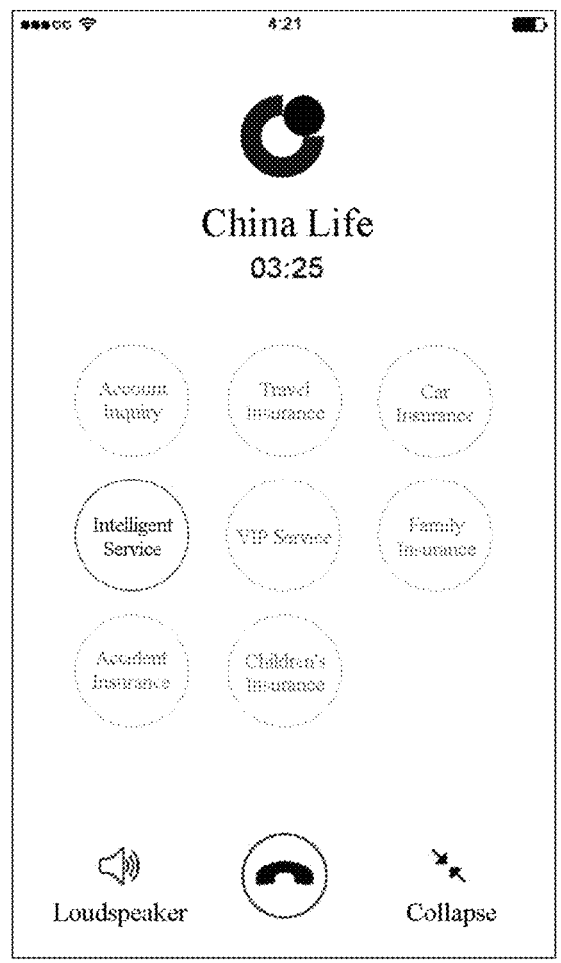

As shown in FIG. 13*c*, when China Life has eight service menus, for example, "Account Inquiry" service menu, "Travel Insurance" service menu, "Car Insurance" service menu, "Intelligent Service" service menu, "VIP Service" service menu, "Family Insurance" service menu, "Accident Insurance" service menu, and "Children's Insurance" service menu, the service menus are displayed in three rows, with three service menus being arranged in each of the first two rows and two service menus being arranged in the last row. When the user terminal needs to obtain an "Intelligent Service" service, the "Intelligent Service" service menu is touched. After receiving a touch signal, the "Intelligent Service" service menu is identified in a deep color to obtain an identified menu of the "Intelligent Service" service menu. Interaction with a service corresponding to China Life is performed by using the identified menu, thus visually providing abundant service functions of the enterprise merchant.

Figure 13D:
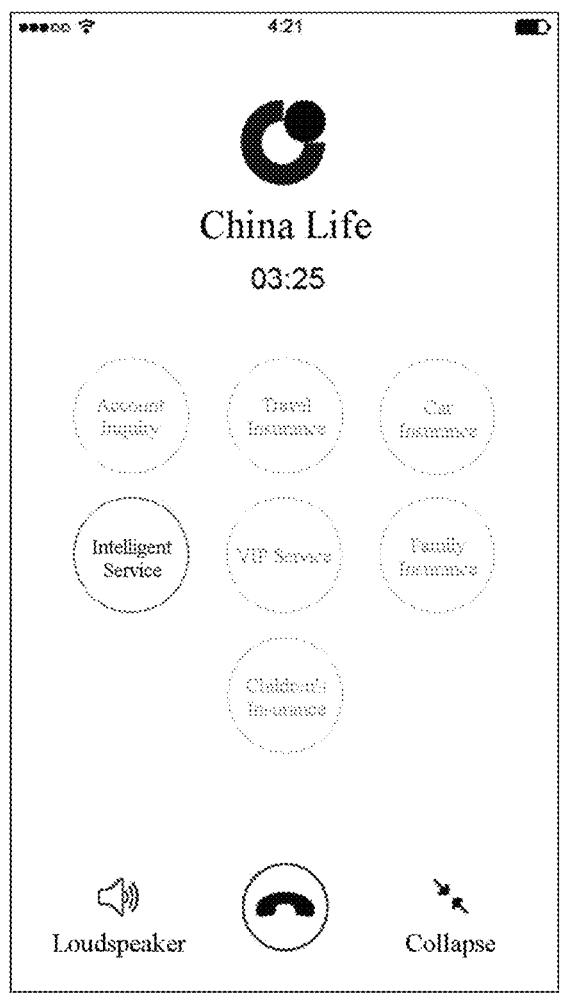

As shown in FIG. 13d, when China Life has seven service menus, for example, "Account Inquiry" service menu, "Travel Insurance" service menu, "Car Insurance" service menu, "Intelligent Service" service menu, "VIP Service" service menu, "Family Insurance" service menu, and "Children's Insurance" service menu, the service menus are displayed in three rows, with three service menus being arranged in each of the first two rows and one service menu being arranged in the middle of the last row. When the user terminal needs to obtain an "Intelligent Service" service, the "Intelligent Service" service menu is touched. After receiving a touch signal, the "Intelligent Service" service menu is identified in a deep color to obtain an identified menu of the "Intelligent Service" service menu. Interaction with a service corresponding to China Life is performed by using the identified menu, thus visually providing abundant service functions of the enterprise merchant.

Figure 13E:
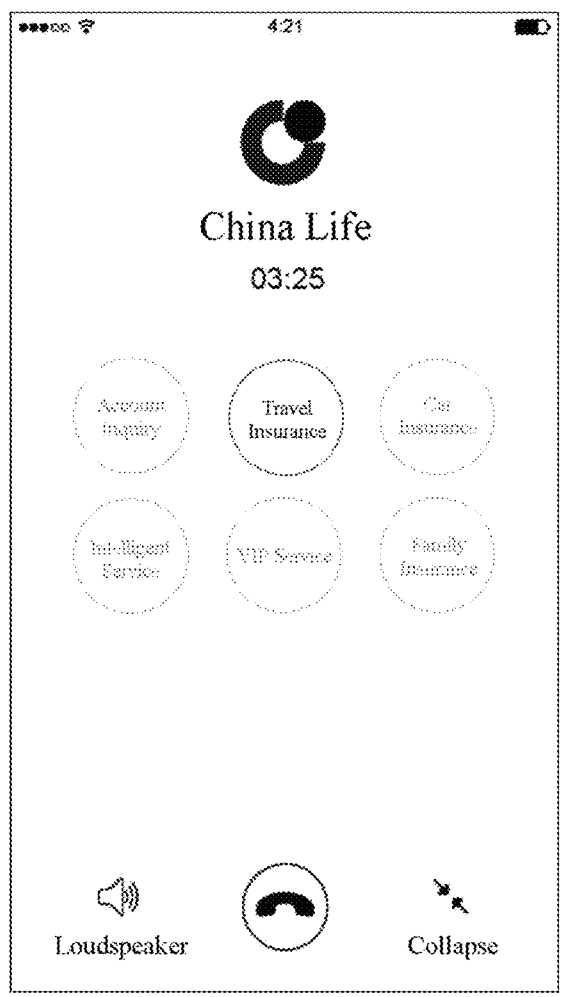

As shown in FIG. 13e, when China Life has six service menus, for example, "Account Inquiry" service menu, "Travel Insurance" service menu, "Car Insurance" service menu, "Intelligent Service" service menu, "VIP Service" service menu, and "Family Insurance" service menu, the service menus are displayed in two rows, with three service menus being arranged in each of the two rows. When the user terminal needs to obtain a "Travel Insurance" service, the "Travel Insurance" service menu is touched. After receiving a touch signal, the "Travel Insurance" service menu is identified in a deep color to obtain an identified menu of the "Travel Insurance" service menu. Interaction with a service corresponding to China Life is performed by using the identified menu, thus visually providing abundant service functions of the enterprise merchant.

Figure 13F:
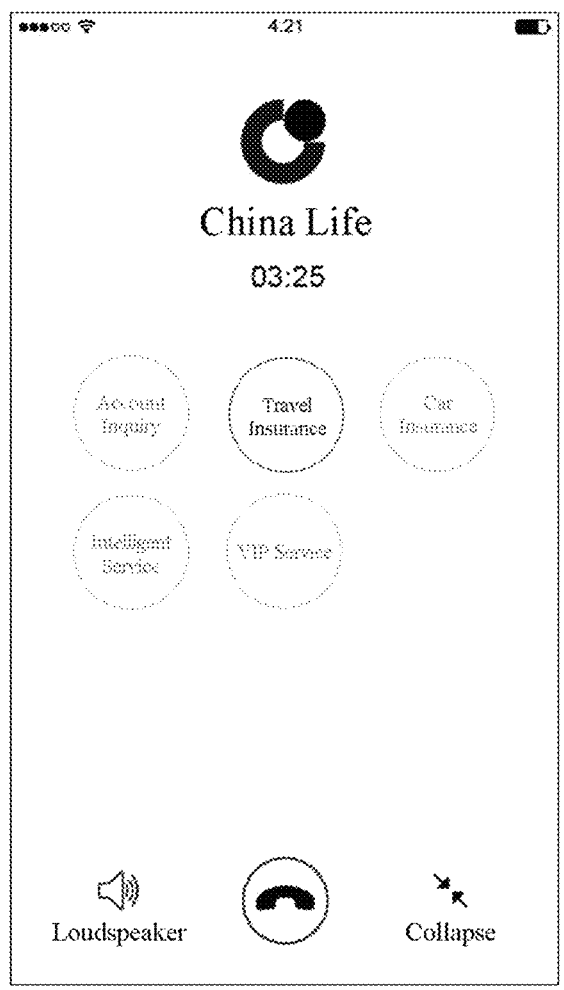

As shown in FIG. 13f, when China Life has five service menus, for example, "Account Inquiry" service menu, "Travel Insurance" service menu, "Car Insurance" service menu, "Intelligent Service" service menu, and "VIP Service" service menu, the service menus are displayed in two rows, with three service menus being arranged in the first row and two service menus being arranged in the second row.

Figure 13G:
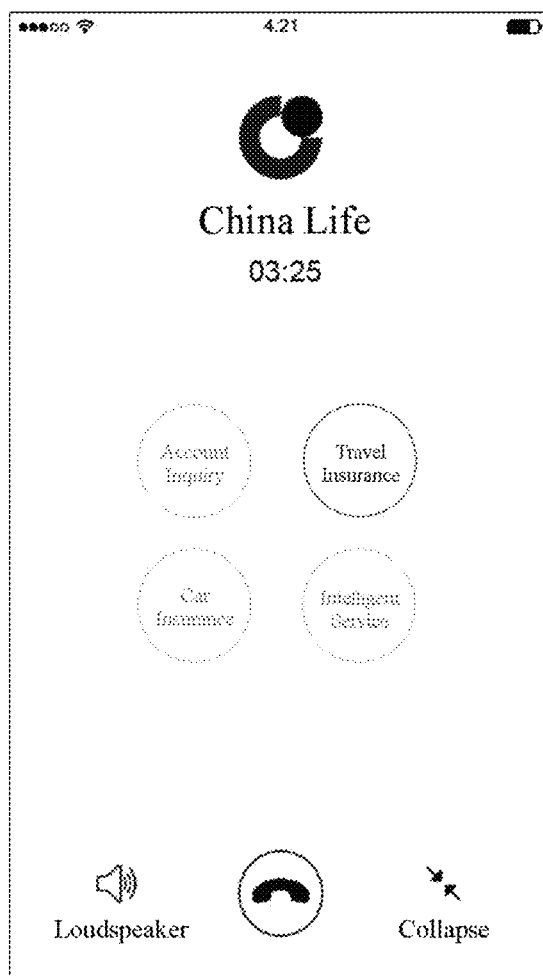

As shown in FIG. 13g, when China Life has four service menus, for example, "Account Inquiry" service menu, "Travel Insurance" service menu, "Car Insurance" service menu, and "Intelligent Service" service menu, the service menus are displayed in two rows, with two service menus being arranged in each row.

Figure 13H:
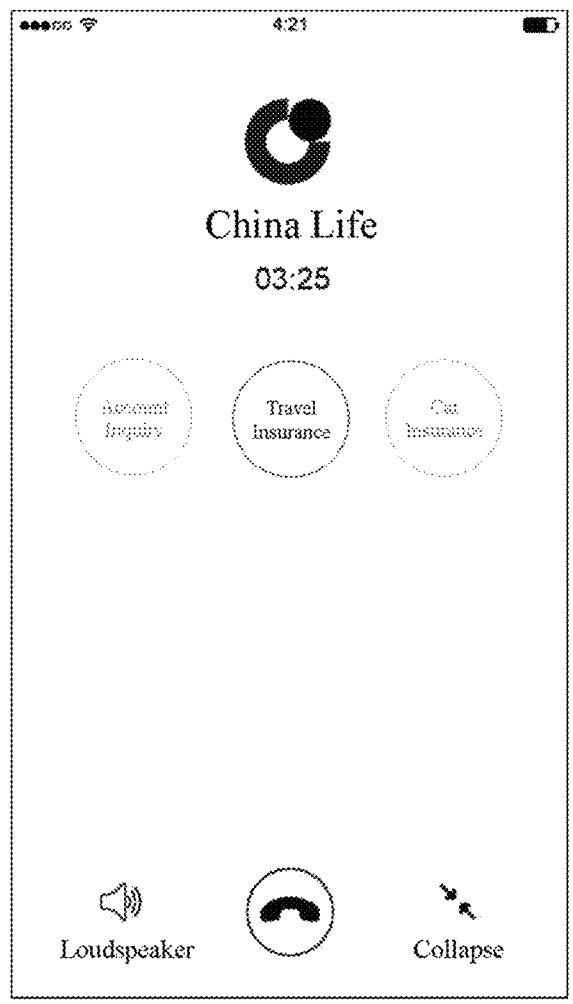

As shown in FIG. 13h, the target event is China Life, and when China Life has three service menus, for example/such as, "Account Inquiry" service menu, "Travel Insurance" service menu, and "Car Insurance" service menu, the three service menus are displayed in one row on the interface of the communication application.

Figure 13I:
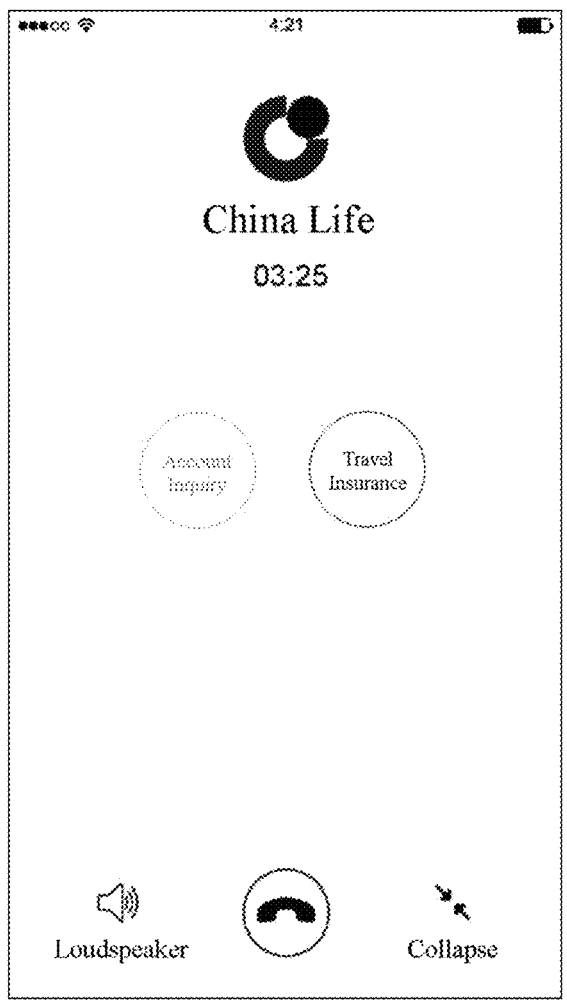

As shown in FIG. 13i, when China Life has two service menus, for example, "Account Inquiry" service menu, "Travel Insurance" service menu, the two service menus are displayed in one row on the interface of the communication application.

Figure 13J:
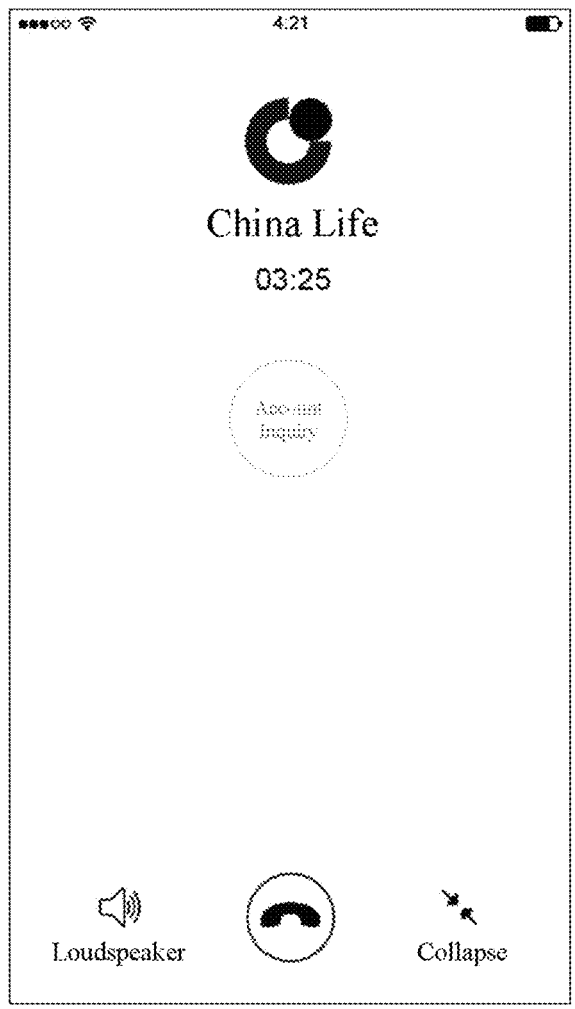

As shown in FIG. 13j, when China Life has one service menu, for example, "Account Inquiry" service menu, the service menu is displayed in one row on the interface of the communication application.

Based on the above, in some embodiments, a method for communicating with a call center, is performed at a device having one or more processors and memory. The device establishes, by an audio and video client, a network session connection to the call center by using an audio and video server. The device receives, through the network session connection, a first-level voice menu sent by the call center. The device obtains a correspondence between visualized menus and voice menus of the call center. The device searches for a first visualized menu corresponding to the first-level voice menu according to the correspondence. The device presents the first visualized menu in a user interface of the audio and video client.

In some embodiments, the device detects user selection of a first option in the first visualized menu presented in the user interface of the audio and video client; and in response to detecting the user selection of the first option in the first visualized menu presented in the user interface of the audio and video client: the device displays an information input interface, the information input interface comprising an input entry region for inputting any one of the following data: picture data, character data, video data, and audio data, and the device obtains network address information of the call center.

In some embodiments, the device receives, through the input entry region of the information input interface, data input by the user; and in response to receiving the data input through the input entry region of the information input interface, the device sends the data input by the user to the call center according to the network address information of the call center.

In some embodiments, the device detects user selection of a second option in the first visualized menu presented in the user interface of the audio and video client; and in response to detecting the user selection of the second option in the first visualized menu presented in the user interface of the audio and video client: the device sends indication information about the second option to the call center through the network session connection; the device receives, through the network session connection, a second-level voice menu corresponding to the second option sent by the call center; the device searches for a second visualized menu corresponding to the second-level voice menu according to the correspondence; and the device presents the second visualized menu in the user interface of the audio and video client, with a representation of the first visualized menu.

In some embodiments, the device plays information about a respective one of a plurality of options in the first visualized menu in an on-demand voice manner in response to user input detected on the respective one option in the user interface.

In some embodiments, the obtaining the correspondence between visualized menus and voice menus of the call center includes: downloading the correspondence between visualized menus and voice menus from the audio and video server.

In some embodiments, the searching for a first visualized menu corresponding to the first-level voice menu according to the correspondence includes: obtaining a preset configuration file according to the correspondence; parsing the preset configuration file to obtain a parsing result; and generating the first visualized menu according to the parsing result.

Other details of the method are described with respect to various embodiments disclosed herein and are not repeated in the interest of brevity.

Figure 14:
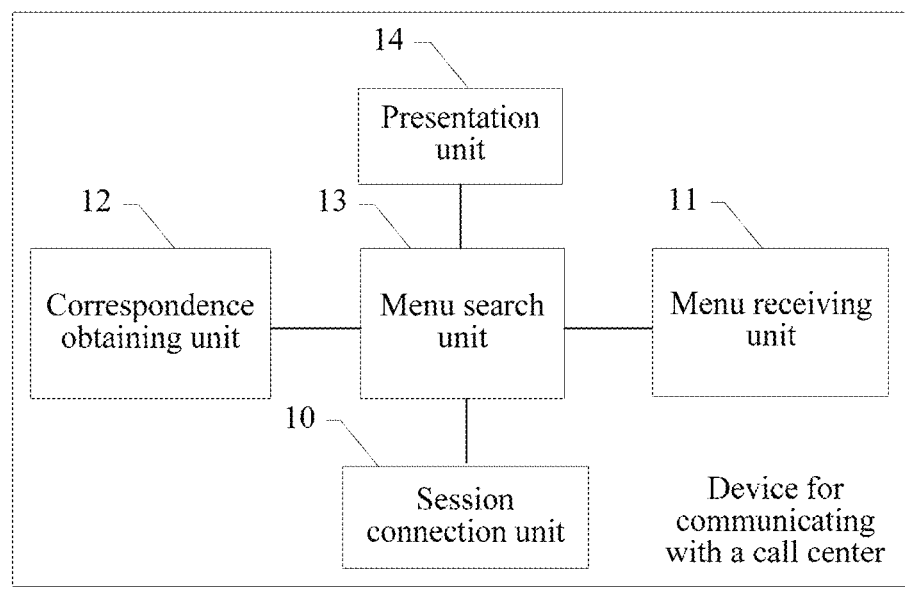
FIG. 14 is a schematic structural diagram of a device for communicating with a call center according to an embodiment of the present disclosure.

Provided is a device for communicating with a call center, for example, the above-mentioned audio and video client. FIG. 14 is a schematic structural diagram of the device, which may specifically include:

a session connection unit 10, configured to establish a network session connection to the call center by using an audio and video server;

a menu receiving unit 11, configured to receive, through the network session connection, a first-level voice menu sent by the call center;

a correspondence obtaining unit 12, configured to obtain a correspondence between visualized menus and voice menus of the call center;

a menu search unit 13, configured to search for a first visualized menu corresponding to the first-level voice menu received by the menu receiving unit 11 according to the correspondence obtained by the correspondence obtaining unit 12, the correspondence obtaining unit 12 being specifically configured to download the correspondence between visualized menus and voice menus from the audio and video server; and a presentation unit 14, configured to present the first visualized menu found by the menu search unit 13. The presentation unit 14 is specifically configured to display, on a user interface, information about at least one option included in the first visualized menu. To facilitate the operation of the user on the first visualized menu, when presenting the first visualized menu, the presentation unit 14 may play the information about the at least one option in a voice manner while displaying the information of each option. The information may include specific content of each option, or prompt information about an operation on each option.

Based on the above, according to the device for communicating with a call center in this embodiment, the menu receiving unit 11 receives, through a network session connection, a first-level voice menu sent by a call center, the menu search unit 13 finds a first visualized menu corresponding to the first-level voice menu according to a correspondence between visualized menus and voice menus of the call center, and the presentation unit 14 presents the first visualized menu. Hence, a user can communicate with the call center by directly operating the first visualized menu; and in the entire communication process, the user can communicate with the call center by visually operating the menu provided by the call center instead of receiving and operating the voice menu, thus facilitating the operation of the user. In addition, because the menu sent by the call center in the method of this embodiment is the same as that sent in a method of an existing technology, i.e., they are both a voice menu, and the menu is visualized by the device for communicating with a call center of this embodiment, thereby providing compatibility with existing call centers of a plurality of enterprises.

In an embodiment of the present disclosure, the session connection unit 10 may further be configured to: receive a connection request of the call center by using a communication application installed on the audio and video client; establish a connection to the call center by using the communication application in response to the connection request; and send a request instruction to the call center, the request instruction being used for requesting the call center to send the first-level voice menu.

In an embodiment of the present disclosure, the menu search unit 13 may further be configured to: obtain a preset configuration file according to the correspondence; parse the preset configuration file to obtain a parsing result; and generate the first visualized menu according to the parsing result.

Figure 15:
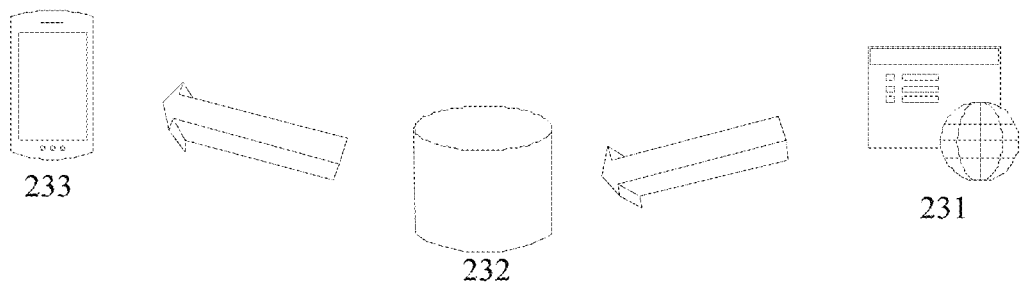
FIG. 15 is a schematic diagram of a template building system according to an embodiment of the present disclosure.

FIG. 15 is a schematic diagram of a template building system according to a device embodiment of the present disclosure. As shown in FIG. 15, the template building system includes: a configuration system 231, a Web server 232, and an audio and video client 233.

The configuration system 231 provides a configuration page for configuring data of a visualized menu. The configuration system 231 saves menu data configured by the system as a configuration file in the JSON or XML format, the configuration file providing IVR menu content and other information of an enterprise merchant. The IVR menu can enter a service center by means of a phone, and plays, according to content input by the user terminal, voice information related to the input. The configuration file can be automatically uploaded to the Web server 232. The server 233 stores the configuration file in the JSON or XML format of the IVR configuration menu. Each enterprise merchant corresponds to one configuration file. When the user terminal taps a service menu corresponding to the target event, a configuration file of a visualized menu is read from a server, configuration data of the visualized menu is obtained, and then a visualized menu page is generated. The user terminal chooses to present a next-level menu, or go back to the previous-level menu, or jump to a page defined by a target event, or enter a manual service page according to the type of the visualized menu, thereby reducing the event interaction time of the application.

Figure 16:
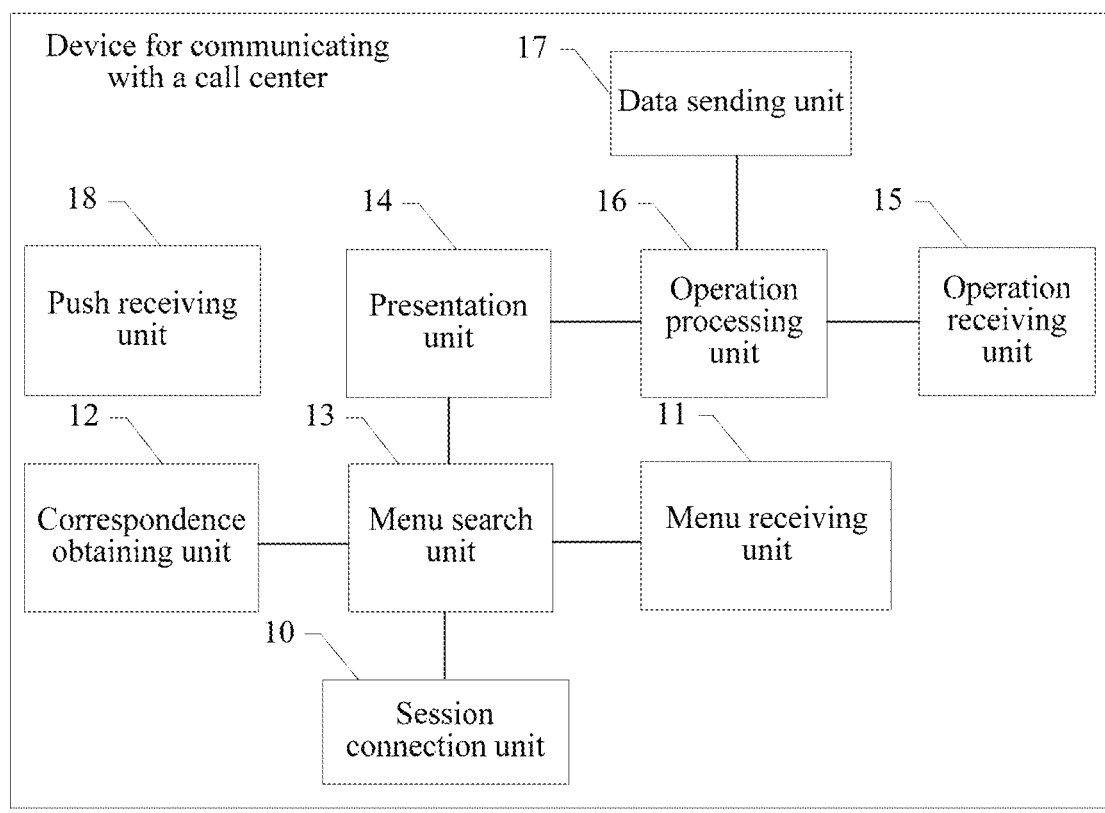
FIG. 16 is a schematic structural diagram of a device for communicating with a call center according to an embodiment of the present disclosure.

Referring to FIG. 16, in a specific embodiment, in addition to the structure shown in FIG. 14, the device for communicating with a call center may further include an operation receiving unit 15, an operation processing unit 16, a data sending unit 17, and a push receiving unit 18.

The operation receiving unit 15 is configured to receive information about an operation of a user on information about a first option in the at least one option presented by the presentation unit 13.

The operation processing unit 16 is configured to display an information input interface according to the information about the operation on the information about the first option, the information input interface including an input entry for inputting any one of the following data: picture data, character data, video data, and audio data;

The data sending unit 17 is configured to receive, from the input entry of the information input interface that is displayed by the operation processing unit 16, data input by the user, and obtain network address information of the call center; send the data input by the user to the call center according to the network address information of the call center.

The push receiving unit 18 is configured to receive a push message sent by the call center, the push message including any one of the following messages: a notification message, a comment interface message, a service processing result, and a rich media message.

Figure 17:
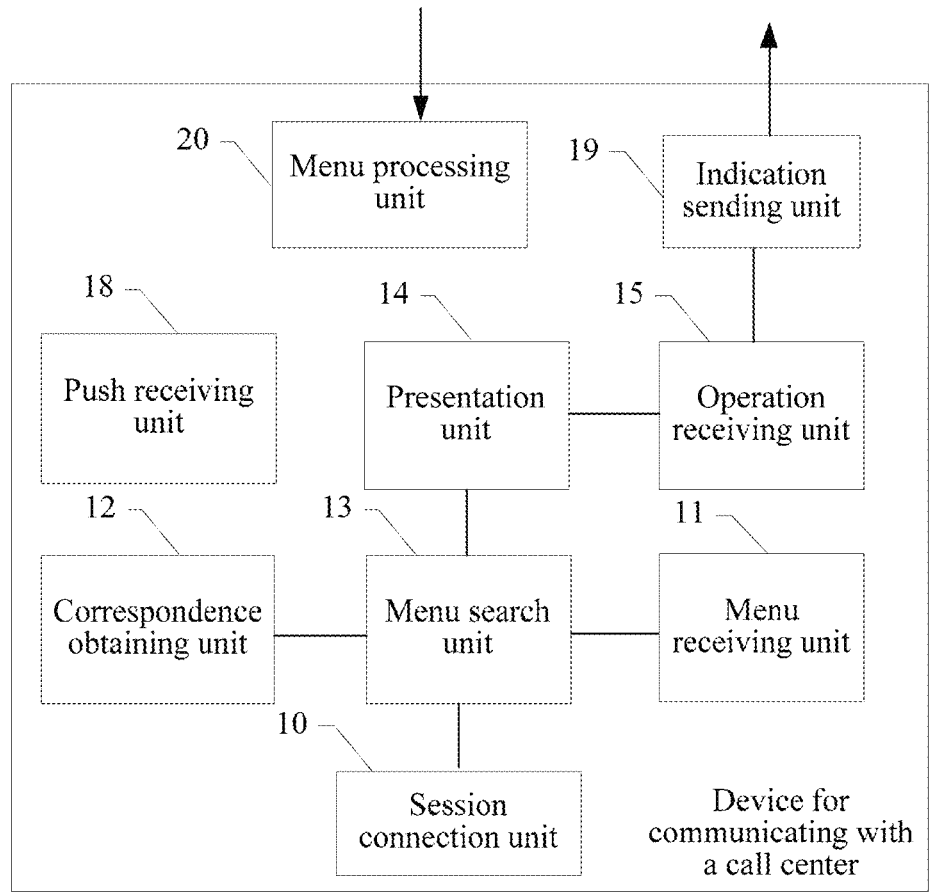
FIG. 17 is a schematic structural diagram of a device for communicating with a call center according to an embodiment of the present disclosure.

Referring to FIG. 17, in another specific embodiment, in addition to the structure shown in FIG. 14, the device for communicating with a call center may further include an operation receiving unit 15, an indication sending unit 19, a menu processing unit 20, and a push receiving unit 18.

The operation receiving unit 15 is configured to receive information about an operation of a user on information about a second option in the at least one option presented by the presentation unit 14.

The indication sending unit 19 is configured to send indication information about the second option to the call center through the network session connection after the operation receiving unit 15 receives the information about the operation on the information about the second option.

The menu processing unit 20 is configured to receive, through the network session connection, a second-level voice menu corresponding to the second option sent by the call center, and present a second visualized menu corresponding to the second-level voice menu according to the correspondence.

The push receiving unit 18 is configured to receive a push message sent by the call center, the push message including any one of the following messages: a notification message, a comment interface message, a service processing result, and a rich media message.

It should be noted that, in another specific embodiment, the device for communicating with a call center may be a combination of the devices for communicating with a call center as shown in FIG. 15 and FIG. 16. That is, in addition to the structure shown in FIG. 14, the device for communicating with a call center further includes the operation receiving unit 15, the operation processing unit 16, the data sending unit 17, the push receiving unit 18, the indication sending unit 19, and the menu processing unit 20, and will not be described in detail herein again.

Figure 18:
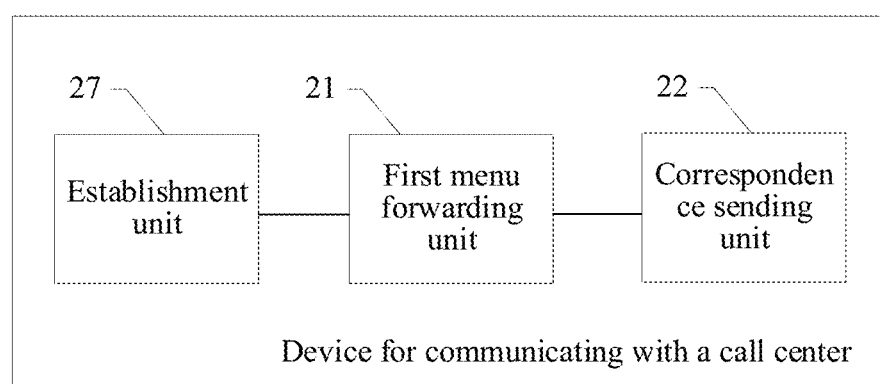
FIG. 18 is a schematic structural diagram of a device for communicating with a call center according to an embodiment of the present disclosure.

Provided is a device for communicating with a call center, for example, the above-mentioned audio and video server. FIG. 18 is a schematic structural diagram of the device, which may specifically include:

an establishment unit 27, configured to establish a network session connection between an audio and video client and the call center by using the device for communicating with a call center;

a first menu forwarding unit 21, configured to send a first-level voice menu sent by the call center to the audio and video client through the network session connection established by the establishment unit 27; and a correspondence sending unit 22, configured to send a correspondence between visualized menus and voice menus of the call center to the audio and video client, the correspondence being used for enabling the audio and video client to present a first visualized menu corresponding to the first-level voice menu sent by the first menu forwarding unit 21 according to the correspondence.

In the device of this embodiment, after the establishment unit 27 establishes a network session connection between the audio and video client and the call center by using the device for communicating with a call center according to this embodiment, the first menu forwarding unit 21 forwards a first-level voice menu sent by the call center to the he audio and video client. The correspondence sending unit 22 sends the correspondence between visualized menus and voice menus of the call center, making it convenient for the audio and video client to present the first visualized menu corresponding to the first-level voice menu. Hence, a user can communicate with the call center by directly operating the first visualized menu presented by the audio and video client; and in the entire communication process, the user can communicate with the call center by visually operating the menu provided by the call center instead of receiving and operating the voice menu, thus facilitating the operation of the user. In addition, because the menu sent by the call center in the method of this embodiment is the same as that sent in a method of an existing technology, i.e., they are both a voice menu, and the menu is visualized by the audio and video client, thereby providing compatibility with existing call centers of a plurality of enterprises.

Figure 19:
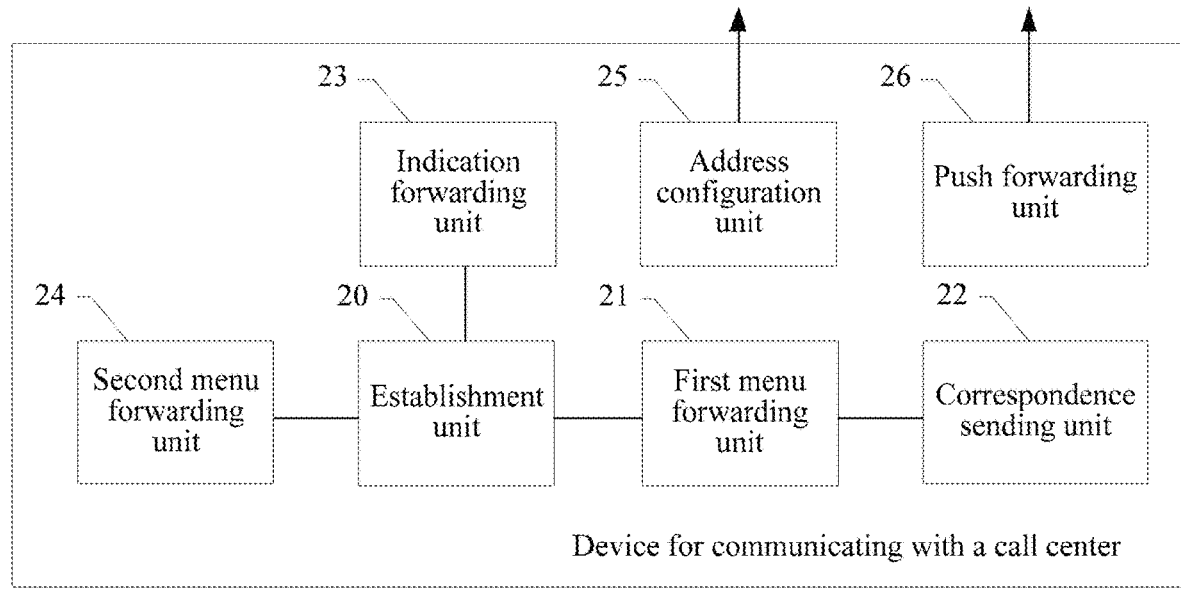
FIG. 19 is a schematic structural diagram of another device for communicating with a call center according to an embodiment of the present disclosure.

Referring to FIG. 19, in another specific embodiment, in addition to the structure shown in FIG. 18, the device for communicating with a call center may further include an indication forwarding unit 23, a second menu forwarding unit 24, an address configuration unit 25, and a push forwarding unit 26.

The indication forwarding unit 23 is configured to: if the first visualized menu includes information about at least one option, send, to the call center through the network session connection established by the establishment unit 27, indication information about a second option selected by a user that is sent by the audio and video client.

The second menu forwarding unit 24 is configured to send, to the audio and video client through the network session connection established by the establishment unit 27, a second-level voice menu corresponding to the second option that is sent by the call center, the second-level voice menu being used by the audio and video client to present a second visualized menu corresponding to the second-level voice menu according to the correspondence.

The address configuration unit 25 is configured to configure network address information of the call center to the audio and video client, the network address information of the call center being used for enabling the audio and video client to send data input by a user to the call center according to the network address information, and the data input by the user includes any one of the following data: picture data, character data, video data, and audio data.

The push forwarding unit 26 is configured to receive a push message sent by the call center, and sending the push message to the audio and video client, the push message including any one of the following messages: a notification message, a comment interface message, a service processing result, and a rich media message.

Figure 20:
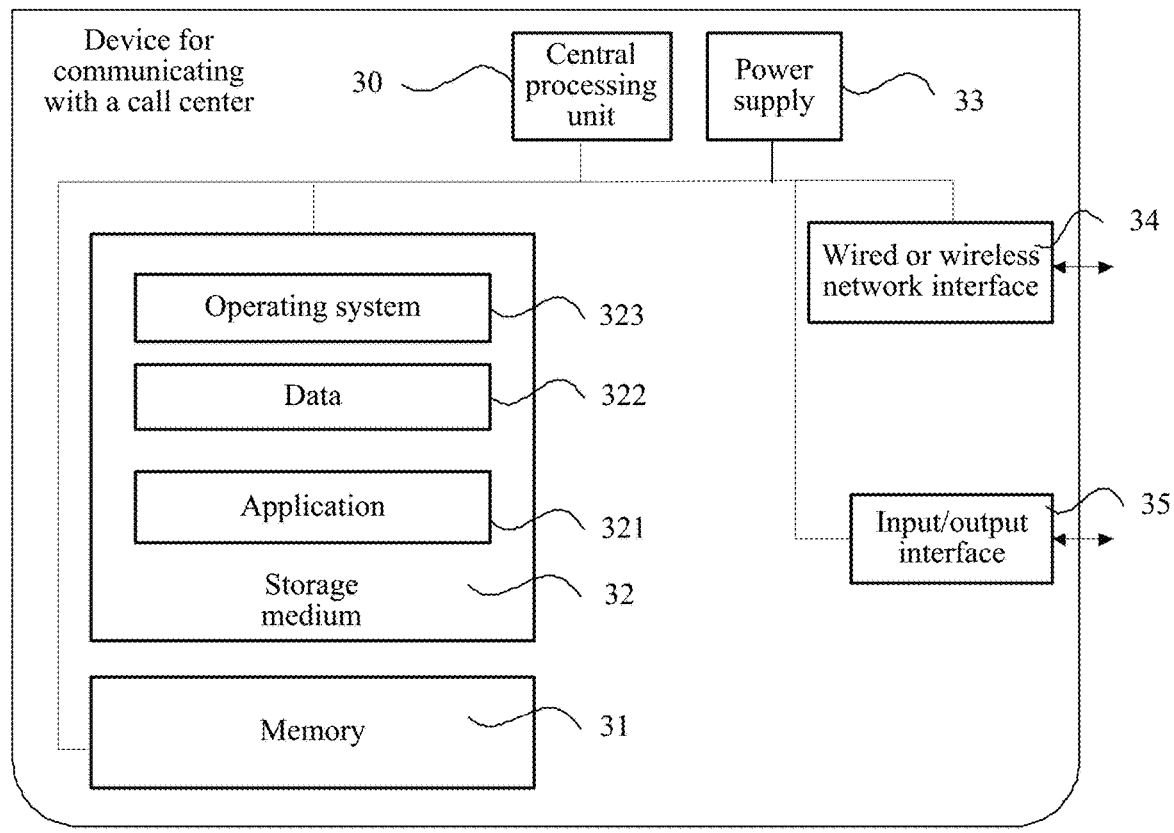
FIG. 20 is a schematic structural diagram of a device for communicating with a call center according to an embodiment of the present disclosure.

Further provided is a device for communicating with a call center. FIG. 20 is a schematic structural diagram of the device. The device for communicating with a call center may vary greatly with different configurations or performance. The device may include one or more central processing units (CPUs) 30 (for example, one or more processors), a memory 31, and one or more storage media 32 storing an application 321 or data 322 (for example, one or more mass storage device). The memory 31 and the storage medium 32 may be temporary or persistent storages. The program stored in the storage medium 32 may include one or more modules (not shown), and each module may include a series of instruction operations on the device for communicating with a call center. Further, the central processing unit 30 may be configured to communicate with the storage medium 32, and execute, on the device for communicating with a call center, the series of instruction operations in the storage medium 32.

The device for communicating with a call center may further include one or more power supplies 33, one or more wired or wireless network interfaces 34, one or more input/output interfaces 35, and/or one or more operating systems 323, for example, Windows Server™, Mac OS X™, Unix™, Linux™, FreeBSD™, and the like.

The steps in the method embodiment that are performed by the audio and video client and the audio and video server may be based on the structure of the device for communicating with a call center shown in FIG. 20.

An embodiment of the present disclosure further provides a system for communicating with a call center. FIG. 1 is a schematic structural diagram of the system, including an audio and video client and an audio and video server. The call center shown in FIG. 1 is drawn for the purpose of facilitating the description of the system of this embodiment. The structure of the audio and video client may be the same as that of the device for communicating with a call center according to Device Embodiment 1 or 2, and the structure of the audio and video server may be the same as that of the device for communicating with a call center according to Device Embodiment 2 or 3. Details will not be described in detail herein again.

Persons of ordinary skill in the art should understand that all or part of the steps in the method of the embodiments may be implemented by a program instructing relevant hardware. The program may be stored in a computer readable storage medium. The storage medium may include a read only memory (ROM), a random access memory (RAM), a magnetic disk or an optical disk or the like.

The method, system, and related device for communicating with a call center that are provided by the embodiments of the present disclosure are described in detail in the foregoing, and the text applies specific examples to describe the principle and implementations of the present disclosure. The foregoing descriptions of the embodiments are only intended to help understand the method and core idea of the present disclosure. Meanwhile, to persons of ordinary skill in the art, changes can be made on the specific implementations and application range according to the idea of the present disclosure. In conclusion, the content of the specification should not be construed as a limit to the present disclosure.

What is claimed is:

1. A method for communicating with a call center, comprising:
   at a client device having one or more processors and memory:
      displaying a plurality of merchant service providers on a user interface of an instant messaging application running on the client device;
      detecting a user selection of a first merchant service provider from the plurality of merchant service providers;
      in response to the user selection:
         transmitting, to an instant messaging server, a request to establish a network session connection to a first call center corresponding to the first merchant service provider, wherein, in response to the request received from the client device, the instant messaging server establishes: a first network session connection to the client device, a second network session connection to the first call center, and a third network session connection between the client device and the first call center;
         receiving, through the third network session connection, a first-level voice menu sent by the first call center;
         obtaining, from the instant messaging server through the first network session connection, correspondence between (1) visualized menus for the first call center retrieved from the instant messaging server and (2) voice menus of the first call center retrieved from the first call center;
         identifying a first visualized menu corresponding to the first-level voice menu according to the correspondence; and
         displaying the first visualized menu including a plurality of options on the user interface of the instant messaging application on the client device and playing voice prompt information of the plurality of options in the first visualized menu received from the first call center at the same time.

2. The method according to claim 1, further comprising:
   detecting user selection of a first option in the first visualized menu presented in the user interface of the client device; and
   in response to detecting the user selection of the first option in the first visualized menu presented in the user interface of the client device:
      displaying an information input interface, the information input interface comprising an input entry region for inputting any one of the following data: picture data, character data, video data, and audio data; and
      obtaining network address information of the first call center.

3. The method according to claim 1, further comprising:
   receiving, through the input entry region of the information input interface, data input by the user; and
   in response to receiving the data input through the input entry region of the information input interface, sending the data input by the user to the call center according to the network address information of the first call center.

4. The method according to claim 1, further comprising:
   detecting user selection of a second option in the first visualized menu presented in the user interface of the client device; and
   in response to detecting the user selection of the second option in the first visualized menu presented in the user interface of the client device:
      sending indication information about the second option to the first call center through the network session connection;
      receiving, through the network session connection, a second-level voice menu corresponding to the second option sent by the first call center;
      searching for a second visualized menu corresponding to the second-level voice menu according to the correspondence; and
      presenting the second visualized menu in the user interface of the client device, with a representation of the first visualized menu.

5. The method according to claim 1, further comprising:
   playing information about a respective one of a plurality of options in the first visualized menu in an on-demand voice manner in response to user input detected on the respective one option in the user interface.

6. The method according to claim 1, wherein the obtaining the correspondence between visualized menus and voice menus of the call center includes:
   downloading the correspondence between the visualized menus and the voice menus from the instant messaging server.

7. The method according to claim 1, wherein the searching for a first visualized menu corresponding to the first-level voice menu according to the correspondence includes:
   obtaining a preset configuration file according to the correspondence;
   parsing the preset configuration file to obtain a parsing result; and
   generating the first visualized menu according to the parsing result.

8. A computing device, comprising:
one or more processors;
memory;
a display; and
a plurality of instructions stored in the memory that, when executed by the one or more processors, cause the one or more processors to perform the following operations:
displaying a plurality of merchant service providers on a user interface of an instant messaging application running on the client device;
detecting a user selection of a first merchant service provider from the plurality of merchant service providers;
in response to the user selection:
transmitting, to an instant messaging server, a request to establish a network session connection to a first call center corresponding to the first merchant service provider, wherein, in response to the request received from the client device, the instant messaging server establishes: a first network session connection to the client device, a second network session connection to the first call center, and a third network session connection between the client device and the first call center;
receiving, through the third network session connection, a first-level voice menu sent by the first call center;
obtaining, from the instant messaging server through the first network session connection, correspondence between (1) visualized menus for the first call center retrieved from the instant messaging server and (2) voice menus of the first call center retrieved from the first call center;
identifying a first visualized menu corresponding to the first-level voice menu according to the correspondence; and
displaying the first visualized menu including a plurality of options on the user interface of the instant messaging application on the client device and playing voice prompt information of the plurality of options in the first visualized menu received from the first call center at the same time.

9. The computing device according to claim 8, wherein the operations further include:
detecting user selection of a first option in the first visualized menu presented in the user interface of the client device; and
in response to detecting the user selection of the first option in the first visualized menu presented in the user interface of the client device:
displaying an information input interface, the information input interface comprising an input entry region for inputting any one of the following data: picture data, character data, video data, and audio data; and
obtaining network address information of the first call center.

10. The computing device according to claim 9, wherein the operations further include:
receiving, through the input entry region of the information input interface, data input by the user; and
in response to receiving the data input through the input entry region of the information input interface, sending the data input by the user to the call center according to the network address information of the first call center.

11. The computing device according to claim 8, wherein the operations further include:
detecting user selection of a second option in the first visualized menu presented in the user interface of the client device; and
in response to detecting the user selection of the second option in the first visualized menu presented in the user interface of the client device:
sending indication information about the second option to the call center through the network session connection;
receiving, through the network session connection, a second-level voice menu corresponding to the second option sent by the first call center;
searching for a second visualized menu corresponding to the second-level voice menu according to the correspondence; and
presenting the second visualized menu in the user interface of the client device, with a representation of the first visualized menu.

12. The computing device according to claim 8, wherein the operations further include:
playing information about a respective one of a plurality of options in the first visualized menu in an on-demand voice manner in response to user input detected on the respective one option in the user interface.

13. The computing device according to claim 8, wherein the obtaining the correspondence between visualized menus and voice menus of the call center includes:
downloading the correspondence between the visualized menus and the voice menus from the instant messaging server.

14. The computing device according to claim 8, wherein the searching for a first visualized menu corresponding to the first-level voice menu according to the correspondence includes:
obtaining a preset configuration file according to the correspondence;
parsing the preset configuration file to obtain a parsing result; and
generating the first visualized menu according to the parsing result.

15. A non-transitory computer-readable storage medium storing a plurality of instructions configured for execution by a computing device having one or more processors and a display, wherein the plurality of instructions cause the computing device to perform the following operations:
displaying a plurality of merchant service providers on a user interface of an instant messaging application running on the client device;
detecting a user selection of a first merchant service provider from the plurality of merchant service providers;
in response to the user selection:
transmitting, to an instant messaging server, a request to establish a network session connection to a first call center corresponding to the first merchant service provider, wherein, in response to the request received from the client device, the instant messaging server establishes: a first network session connection to the client device, a second network session connection to the first call center, and a third network session connection between the client device and the first call center;
receiving, through the third network session connection, a first-level voice menu sent by the first call center;
obtaining, from the instant messaging server through the first network session connection, correspondence between (1) visualized menus for the first call center retrieved from the instant messaging server and (2) voice menus of the first call center retrieved from the first call center;

identifying a first visualized menu corresponding to the first-level voice menu according to the correspondence; and displaying the first visualized menu including a plurality of options on the in user interface of the instant messaging application on the client device and playing voice prompt information of the plurality of options in the first visualized menu received from the first call center at the same time.

16. The non-transitory computer-readable storage medium according to claim 15, wherein the operations further include:

detecting user selection of a first option in the first visualized menu presented in the user interface of the client device; and in response to detecting the user selection of the first option in the first visualized menu presented in the user interface of the client device:

displaying an information input interface, the information input interface comprising an input entry region for inputting any one of the following data: picture data, character data, video data, and audio data; and obtaining network address information of the first call center.

17. The non-transitory computer-readable storage medium according to claim 16, wherein the operations further include:

receiving, through the input entry region of the information input interface, data input by the user; and in response to receiving the data input through the input entry region of the information input interface, sending the data input by the user to the call center according to the network address information of the first call center.

18. The non-transitory computer-readable storage medium according to claim 15, wherein the operations further include:

detecting user selection of a second option in the first visualized menu presented in the user interface of the client device; and in response to detecting the user selection of the second option in the first visualized menu presented in the user interface of the client device:

sending indication information about the second option to the first call center through the network session connection;

receiving, through the network session connection, a second-level voice menu corresponding to the second option sent by the first call center;

searching for a second visualized menu corresponding to the second-level voice menu according to the correspondence; and presenting the second visualized menu in the user interface of the client device, with a representation of the first visualized menu.

19. The non-transitory computer-readable storage medium according to claim 15, wherein the operations further include:

playing information about a respective one of a plurality of options in the first visualized menu in an on-demand voice manner in response to user input detected on the respective one option in the user interface.

20. The non-transitory computer-readable storage medium according to claim 15, wherein the obtaining the correspondence between visualized menus and voice menus of the call center includes:

downloading the correspondence between the visualized menus and the voice menus from the instant messaging server.

\* \* \* \* \*